US 12,395,258 B2

(12) United States Patent
Hayama

(10) Patent No.: US 12,395,258 B2
(45) Date of Patent: Aug. 19, 2025

(54) OUTPUT SIGNAL GENERATION DEVICE, CONTROL CIRCUIT, STORAGE MEDIUM, AND PHASE CORRECTION METHOD

(71) Applicant: Mitsubishi Electric Corporation, Tokyo (JP)

(72) Inventor: Michiya Hayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 326 days.

(21) Appl. No.: 18/168,626

(22) Filed: Feb. 14, 2023

(65) Prior Publication Data
US 2023/0188236 A1    Jun. 15, 2023

Related U.S. Application Data

(63) Continuation of application No. PCT/JP2020/034289, filed on Sep. 10, 2020.

(51) Int. Cl.
*H04J 3/04* (2006.01)
*H04Q 11/04* (2006.01)

(52) U.S. Cl.
CPC .............. *H04J 3/047* (2013.01); *H04Q 11/04* (2013.01)

(58) Field of Classification Search
CPC ................................ H04J 3/047; H04Q 11/04
USPC ........................................................ 370/535
See application file for complete search history.

(56) References Cited

U.S. PATENT DOCUMENTS

| 11,088,731 B2 | 8/2021 | Kim et al. |
| 11,502,405 B2 | 11/2022 | Mochizuki |
| 2007/0024476 A1* | 2/2007 | Saeki ............... H03M 9/00 341/101 |
| 2021/0336659 A1 | 10/2021 | Kim et al. |

FOREIGN PATENT DOCUMENTS

| JP | 2019-536362 A | 12/2019 |
| JP | 2020-57968 A | 4/2020 |

OTHER PUBLICATIONS

Suematsu et al., "Direct Digital RF Technology", The Institute of Electronics, Information and Communication Engineers (IEICE), Nov. 2019, vol. J102-C, No. 11, pp. 297-304.

* cited by examiner

*Primary Examiner* — Faisal Choudhury
(74) *Attorney, Agent, or Firm* — Birch, Stewart, Kolasch & Birch, LLP

(57) ABSTRACT

An output signal generation device includes: two or more signal output blocks that each include two or more serial output circuits and a signal multiplex unit, the serial output circuits controlling amplitudes of data signals having different delay times and each outputting a first serial signal, the signal multiplex unit electrically multiplexing the first serial signals outputted from the two or more serial output circuits, and output a second serial signal obtained by electrical multiplex of the signal multiplex unit; and a phase correction unit that controls a phase of the second serial signal outputted from the two or more signal output blocks by changing the amplitude of the first serial signal outputted from the serial output circuit.

20 Claims, 17 Drawing Sheets

OUTPUT SIGNAL GENERATION DEVICE, CONTROL CIRCUIT, STORAGE MEDIUM, AND PHASE CORRECTION METHOD

CROSS-REFERENCE TO RELATED APPLICATION

This application is a continuation application of International Application PCT/JP2020/034289, filed on Sep. 10, 2020, and designating the U.S., the entire contents of which are incorporated herein by reference.

BACKGROUND OF THE INVENTION

1. Field of the Invention

The present disclosure relates to an output signal generation device that outputs a plurality of serial signals, a control circuit, a storage medium, and a phase correction method.

2. Description of the Related Art

In recent years, studies have been conducted on a technique called direct digital radio frequency (RF), in which an RF (radio frequency) signal is outputted from a field programmable gate array (FPGA) using a delta-sigma digital analog converter (DAC). In the direct digital RF system, a serial output circuit built in the FPGA is often used as an output circuit. The FPGA typically has several tens to several hundreds of serial output circuits built therein, and a single FPGA can be used to configure an array antenna in combination with the above-described technique. Such an array antenna requires a mechanism for adjusting the phase of each antenna element and further requires calibration for matching the phases of the antenna elements.

The serial output circuit built in the FPGA has a delay adjustment function of reducing skew between adjacent channels, and in an application such as high-speed data transmission, this delay adjustment function is used to perform phase adjustment between the channels. Moreover, as a method of calibrating a transmission array antenna in the field of array antennas or the like, Japanese Patent Application Laid-open No. 2020-57968 (JP2020057968(A)) discloses a technique in which known signals generated individually from antenna elements are received by a common receiver to acquire their respective transmission characteristics, and a transmission signal is made different for each antenna element on the basis of the acquired transmission characteristics to output the transmission signal.

In a case where the array antenna is configured using the serial output circuits built in the FPGA, it is necessary to match zero points of signal phases with each other in the plurality of serial output circuits and then perform dynamic phase change. Many of the serial output circuits built in the FPGA have a function of reducing skew between channels by adjusting a delay time of an output signal. However, there has been a problem that it is difficult to perform fine adjustment of less than one unit interval (UI) by the delay adjustment function. Many of such delay adjustment functions are based on the assumption of adjustment in skew between channels that are physically close within a chip, and are not suitable for applications in which phase adjustment is performed on a scale of several tens to several hundreds of serial output circuits.

There has also been a problem that the execution of the technique of Patent Literature 1 is limited to a timing when a device does not transmit an original transmission signal. In the technique of Patent Literature 1, a transmission waveform needs to be changed for each antenna element on the basis of a calibration result, but in a case where the technique is applied to a transmission device using direct digital RF, the transmission signal is a low bit quantized signal of about one to two bits, so that it is difficult to perform continuous phase rotation by signal processing in the FPGA. In this case, phase adjustment needs to be performed by delaying a transmission signal, but it is difficult for the delay adjustment function incidental to the serial output circuit to perform fine adjustment of less than one UI as described above.

SUMMARY OF THE INVENTION

In order to solve the above-mentioned problems, the present disclosure provides an output signal generation device comprising: two or more signal output circuitries each including two or more serial output circuits and a signal multiplexer, the serial output circuits controlling amplitudes of data signals having different delay times and each outputting a first serial signal, the signal multiplexer electrically multiplexing the first serial signals outputted from the two or more of the serial output circuits, the signal output circuitries each being configured to output a second serial signal obtained by electrical multiplex of the signal multiplexer; and a phase corrector to control a phase of the second serial signal outputted from the two or more signal output circuitries by changing the amplitude of the first serial signal outputted from the serial output circuit.

DETAILED DESCRIPTION OF THE PREFERRED EMBODIMENTS

Hereinafter, an output signal generation device, a control circuit, a storage medium, and a phase correction method according to embodiments of the present disclosure will be described in detail with reference to the drawings.

First Embodiment

Figure 1:
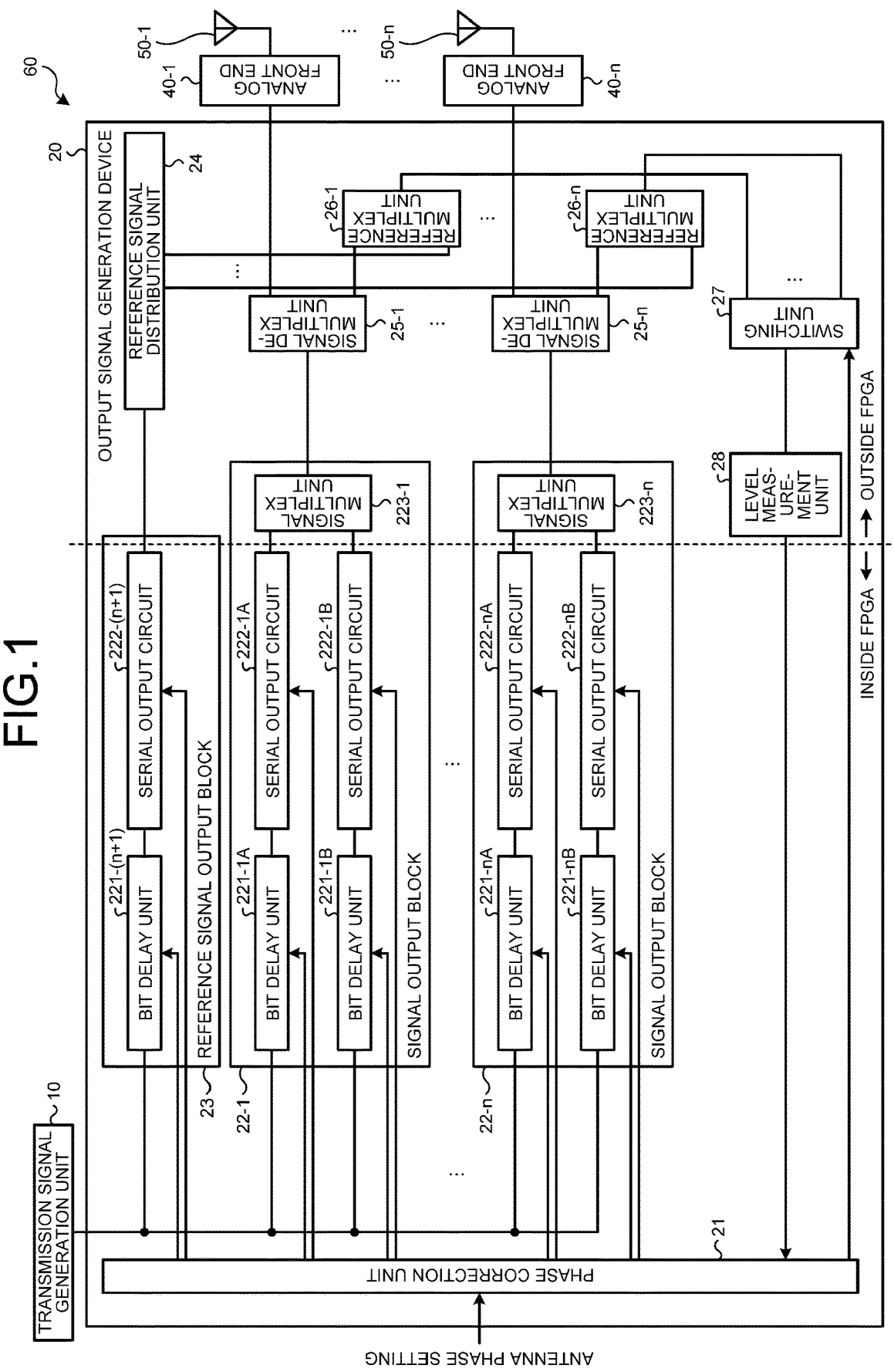
FIG. 1 is a diagram illustrating an example of a configuration of an n-element array antenna transmitter including an output signal generation device according to a first embodiment.

FIG. 1 is a diagram illustrating an example of a configuration of an n-element array antenna transmitter 60 including an output signal generation device 20 according to a first embodiment. The n-element array antenna transmitter 60 is a device that is configured to transmit serial signals from "n" antenna elements 50-1 to 50-n. The n-element array antenna transmitter 60 includes a transmission signal generation unit or generator 10, the output signal generation device 20, analog front ends 40-1 to 40-n, and the antenna elements 50-1 to 50-n. The output signal generation device 20 is connected to the transmission signal generation unit 10 and the analog front ends 40-1 to 40-n. The transmission signal generation unit 10 generates a data signal that is a transmission signal serving as a source of the serial signal transmitted by the n-element array antenna transmitter 60, and outputs the data signal to the output signal generation device 20.

Figure 2:
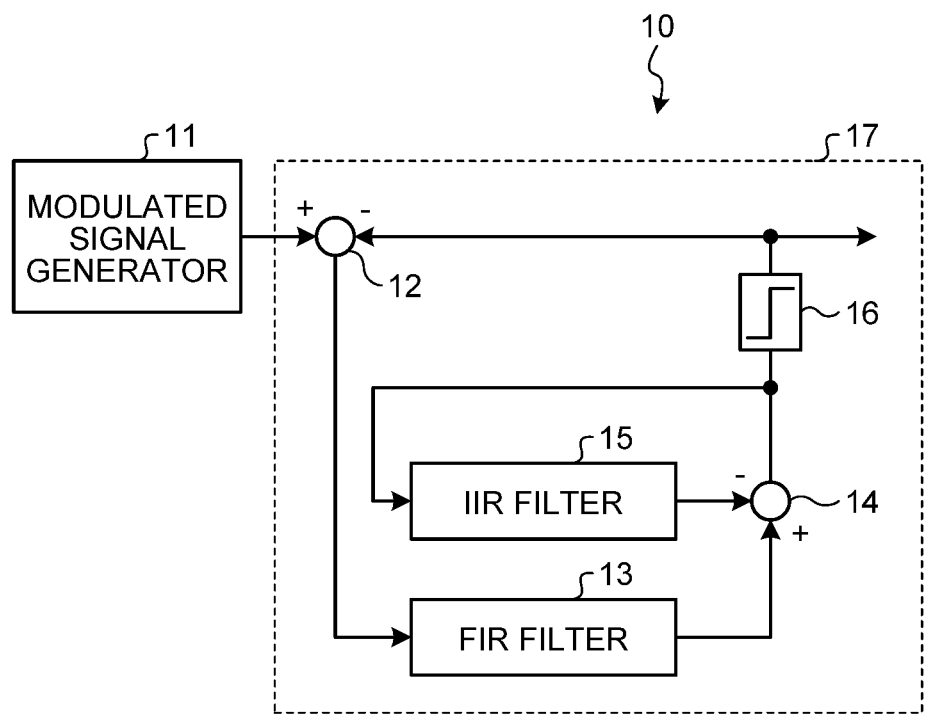
FIG. 2 is a diagram illustrating an example of a configuration of a transmission signal generation unit connected to the output signal generation device according to the first embodiment.

FIG. 2 is a diagram illustrating an example of a configuration of the transmission signal generation unit 10 connected to the output signal generation device 20 according to the first embodiment. The transmission signal generation unit 10 includes a modulated signal generator 11, a subtractor 12, a finite impulse response (FIR) filter 13, a subtractor 14, an infinite impulse response (IIR) filter 15, and a quantizer 16. The subtractor 12, the FIR filter 13, the subtractor 14, the IIR filter 15 that is a feedback type filter, and the quantizer 16 that performs nonlinear processing constitute a filter circuit 17. The filter circuit 17 is known as a circuit called a delta-sigma DAC. The delta-sigma DAC is a circuit that allows for out-of-band noise, thereby to enable the number of quantizing bits of an input signal to be reduced. The transmission signal generation unit 10 outputs the data signal generated using the IIR filter 15 that is a feedback type filter, to the output signal generation device 20.

Figure 3:
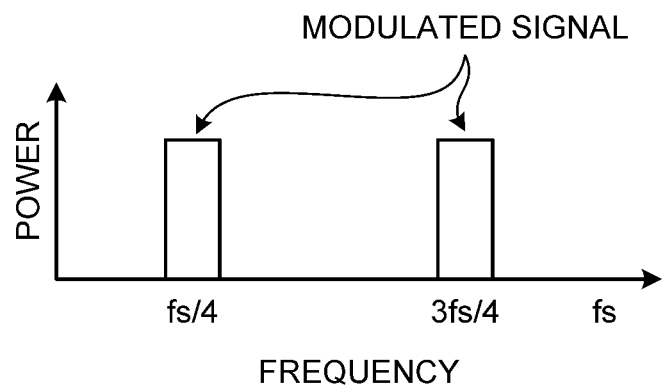
FIG. 3 is a graph illustrating an example of an input spectrum to a delta-sigma DAC that is a filter circuit included in the transmission signal generation unit according to the first embodiment.
Figure 4:
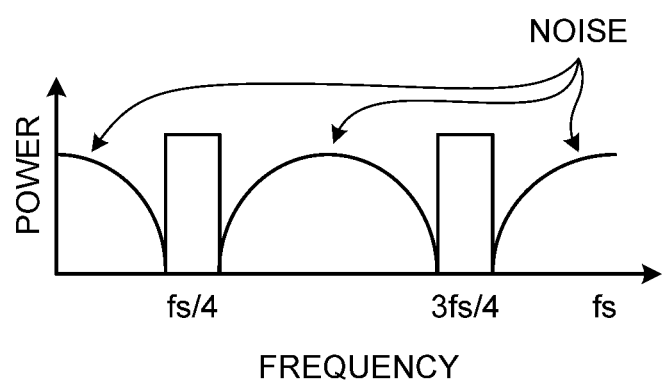
FIG. 4 is a graph illustrating an example of an output spectrum from the delta-sigma DAC that is the filter circuit included in the transmission signal generation unit according to the first embodiment.

FIG. 3 is a graph illustrating an example of an input spectrum to the delta-sigma DAC that is the filter circuit 17 included in the transmission signal generation unit 10 according to the first embodiment. FIG. 4 is a graph illustrating an example of an output spectrum from the delta-sigma DAC that is the filter circuit 17 included in the transmission signal generation unit 10 according to the first embodiment. In FIGS. 3 and 4, the horizontal axis represents frequency, and the vertical axis represents electric power. The band-pass delta-sigma DAC has signal bands at frequencies of fs/4 and 3×fs/4 where a sampling frequency is represented by "fs". Modulated signals illustrated in FIGS. 3 and 4 correspond thereto. The number of quantizing bits satisfies a relationship of (input spectrum>output spectrum), and in the output spectrum, broadband noise is caused outside the signal bands as illustrated in FIG. 4. The transmission signal generation unit 10 outputs the generated data signal to signal output blocks or circuitries 22-1 to 22-n and a reference signal output block or circuitry 23 which are included in the output signal generation device 20.

The description refers back to FIG. 1. The output signal generation device 20 uses the data signal generated by the transmission signal generation unit 10 to generate "n" serial signals, and outputs the serial signals to the analog front ends 40-1 to 40-n. The analog front ends 40-1 to 40-n each include circuit elements such as a filter and an amplifier, and transmit the serial signal generated by the output signal generation device 20 from each of the antenna elements 50-1 to 50-n. In the following description, the analog front ends 40-1 to 40-n may be referred to as an analog front end 40 or analog front ends 40 when not distinguished from one another, and the antenna elements 50-1 to 50-n may be referred to as an antenna element 50 or antenna elements 50 when not distinguished from one another.

The configuration and operation of the output signal generation device 20 will be described in detail. As illustrated in FIG. 1, the output signal generation device 20 includes a phase correction unit or corrector 21, the signal output blocks 22-1 to 22-n, the reference signal output block 23, a reference signal distribution unit or distributor 24, signal demultiplex units or demultiplexers 25-1 to 25-n, reference multiplex units or multiplexers 26-1 to 26-n, a switching unit 27, and a level measurement unit or measurer 28. The signal output block 22-1 includes bit delay units or circuits 221-1A and 221-1B, serial output circuits 222-1A and 222-1B, and a signal multiplex unit or multiplexer 223-1. Likewise, the signal output block 22-n includes bit delay units or circuits 221-nA and 221-nB, serial output circuits 222-nA and 222-nB, and a signal multiplex unit or multiplexer 223-n.

In the following description, the signal output blocks 22-1 to 22-n may be referred to as a signal output block 22 or signal output blocks 22 when not distinguished from one another, the bit delay units 221-1A and 221-1B to 221-nA and 221-nB may be referred to as a bit delay unit or circuit 221 or bit delay units or circuits 221 when not distinguished from one another, the serial output circuits 222-1A and 222-1B to 222-nA and 222-nB may be referred to as a serial output circuit 222 or serial output circuits 222 when not distinguished from one another, and the signal multiplex units 223-1 to 223-n may be referred to as a signal multiplex unit or multiplexer 223 or signal multiplex units or multiplexers 223 when not distinguished from one another. As illustrated in FIG. 1, the signal output block 22 includes two sets for a data signal input systems for acquiring a data signal from the transmission signal generation unit 10, two sets for delay control signal input systems for acquiring a delay control signal from the phase correction unit 21, and two sets for an amplitude control signal input systems for acquiring an amplitude control signal from the phase correction unit 21.

The bit delay unit 221 is a circuit capable of delaying a bit sequence of the data signal acquired from the transmission signal generation unit 10 by one bit or more in units of one bit on the basis of the delay control signal from the phase correction unit 21, that is, the control of the phase correction unit 21. The bit delay unit 221 outputs the delayed data signal to the serial output circuit 222. The bit delay unit 221 is implemented by a combinational circuit, a combination of flip-flop circuits, or the like in the FPGA.

The serial output circuit 222 is a circuit capable of changing the amplitude of the delayed data signal acquired from the bit delay unit 221 on the basis of the amplitude control signal from the phase correction unit 21, that is, the control of the phase correction unit 21. The serial output circuit 222 outputs a first serial signal obtained by controlling the amplitude of the data signal to the signal multiplex unit 223. The serial output circuit 222 is implemented by a gigabit transceiver, a SERializer/DESerializer (SERDES), a general-purpose digital Input/Output (IO), or the like built in the FPGA.

The signal multiplex unit 223 electrically multiplexes the first serial signals acquired from the two serial output circuits 222, that is, the two first serial signals. The signal multiplex unit 223 outputs a serial signal obtained by electrically multiplexing the two first serial signals as a second serial signal. The signal multiplex unit 223 is implemented by a circuitry such as a resistor-based power divider or a Wilkinson divider.

Figure 5:
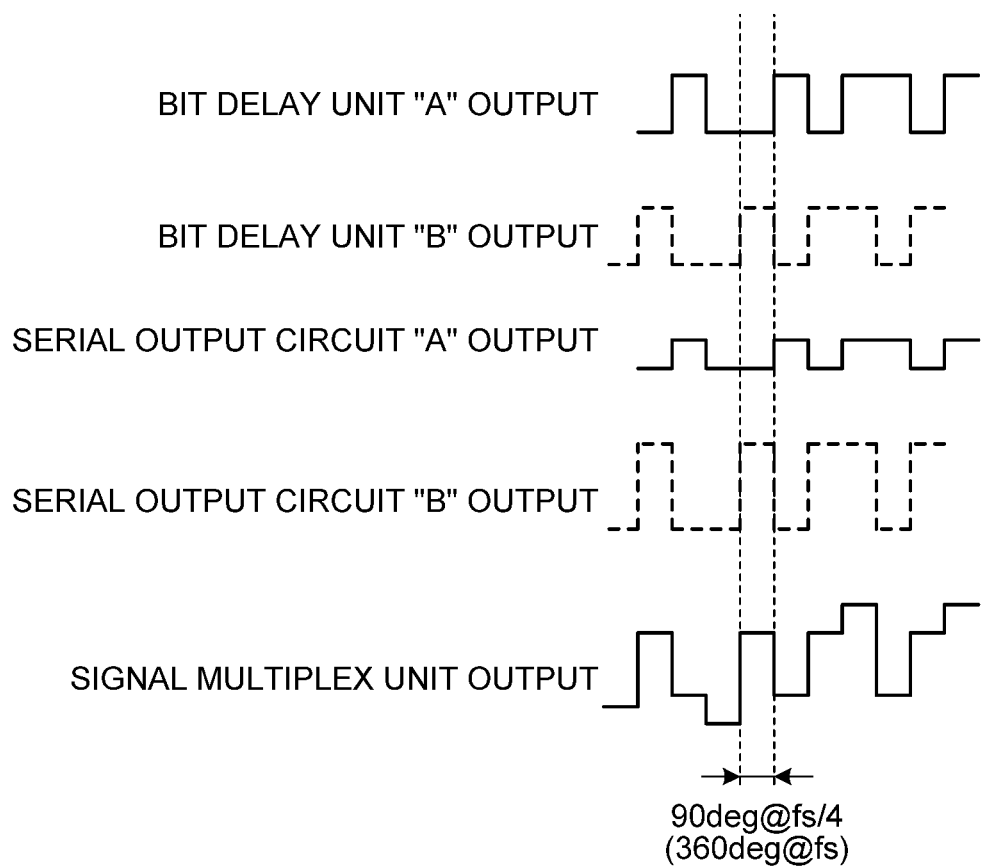
FIG. 5 is a diagram illustrating examples of signal waveforms in a signal output block included in the output signal generation device according to the first embodiment.

FIG. 5 is a diagram illustrating examples of signal waveforms in the signal output block 22 included in the output signal generation device 20 according to the first embodiment. As examples of the signal waveforms in the signal output block 22, FIG. 5 illustrates waveforms when a one-bit delay difference is set by the bit delay units 221-kA and 221-kB on the basis of the delay control signal, and output amplitudes of the serial output circuits 222-kA and 222-kB are set to be asymmetric on the basis of the amplitude control signal. FIG. 5 also illustrates the second serial signal outputted from the signal multiplex unit 223-k. As illustrated in FIG. 5, the one-bit delay difference corresponds to a 90-degree phase difference at a frequency of ¼ of the sampling rate "fs". Therefore, the second serial signal that is the output from the signal multiplex unit 223 is a signal that changes with a period of ¼ of the sampling rate "fs". Note that, in order to simplify the description, FIG. 5 illustrates the bit delay units 221-kA and 221-kB as bit delay units A and B, respectively, and illustrates the serial output circuits 222-kA and 222-kB as serial output circuits A and B, respectively. Here, "k" is an integer satisfying 1≤k≤n. A similar way of illustration and representation applies to the subsequent drawings.

Figure 6:
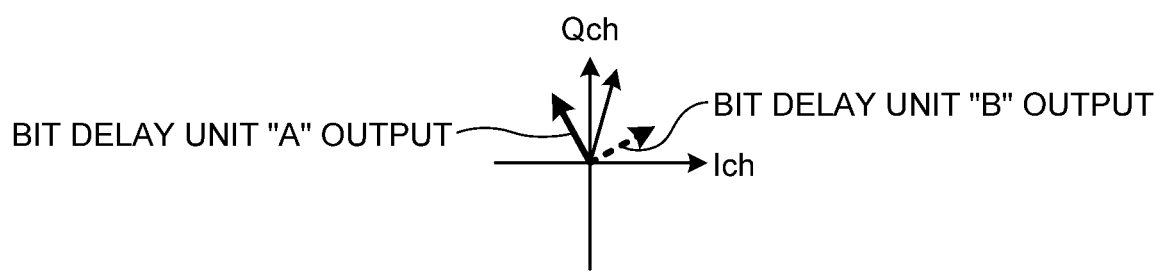
FIG. 6 is a first diagram illustrating an example in which a phase relationship of signals in the signal output block included in the output signal generation device according to the first embodiment is represented by a vector diagram.
Figure 7:
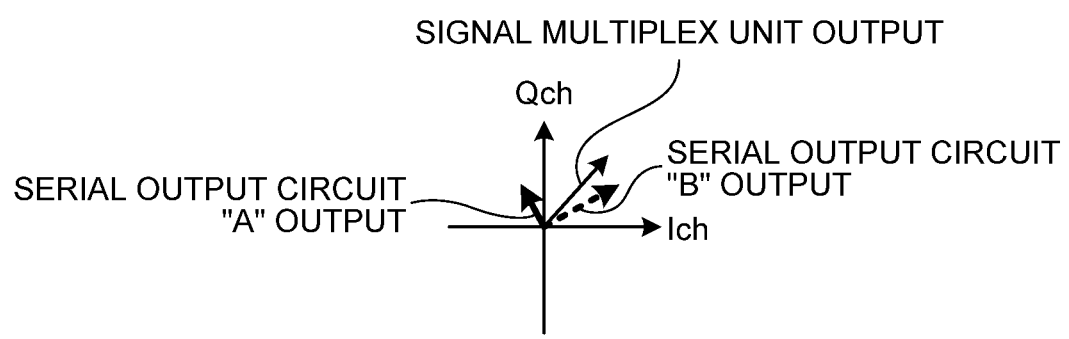
FIG. 7 is a second diagram illustrating an example in which a phase relationship of signals in the signal output block included in the output signal generation device according to the first embodiment is represented by a vector diagram.

FIG. 6 is a first diagram illustrating an example in which a phase relationship of the signals in the signal output block 22 included in the output signal generation device 20 according to the first embodiment is represented by a vector diagram. FIG. 7 is a second diagram illustrating an example in which a phase relationship of the signals in the signal output block 22 included in the output signal generation device 20 according to the first embodiment is represented by a vector diagram. FIG. 6 illustrates an output waveform in a case where the output from the bit delay unit 221-kA and the output from the bit delay unit 221-kB are multiplexed. Since no amplitude control is performed in this situation, the lengths of vectors representing the outputs from the bit delay units 221-kA and 221-kB are constant. FIG. 7 illustrates output waveforms of the outputs from the serial output circuits 222-kA and 222-kB and the output from the signal multiplex unit 223. As illustrated in FIG. 7, changing the amplitude ratio of the serial output circuits 222-kA and 222-kB can arbitrarily set a combined phase for the signal multiplex unit 223 at the frequency of fs/4.

Here, when e is a target combined phase and a:b is the amplitude ratio to be set in the serial output circuits 222-kA and 222-kB, "a" and "b" need only satisfy a relationship of expression (1). In particular, in a case where the transmission signal generation unit 10 includes the delta-sigma DAC circuit that is the filter circuit 17 as illustrated in FIG. 2, the signal frequency of the data signal outputted from the transmission signal generation unit 10 is fs/4, which satisfies the phase relationship illustrated in FIG. 7.

$$a = \sin\theta, b = \cos\theta \quad (1)$$

Note that in the present embodiment, the signal output block 22 is configured to have two bit delay units 221, two serial output circuits 222, and one signal multiplex unit 223, but this configuration is just one example, and the present disclosure is not limited to this example. The signal output block 22 may include three or more bit delay units 221 and three or more serial output circuits 222. In this case, the signal multiplex unit 223 electrically multiplexes the first serial signals acquired from the three or more serial output circuits 222, and outputs the multiplexed signal as the second serial signal.

The reference signal output block 23 includes a bit delay unit or circuit 221-(n+1) and a serial output circuit 222-(n+1). The bit delay unit 221-(n+1) has a configuration similar to that of the bit delay unit 221, and the serial output circuit 222-(*n*+1) has a configuration similar to that of the serial output circuit 222. In the following description, the bit delay units 221-1A and 221-1B to 221-*n*A and 221-*n*B and 221-(*n*+1) may be referred to as a bit delay unit or circuit 221 or bit delay units or circuits 221 when not distinguished from one another, and the serial output circuits 222-1A and 222-1B to 222-*n*A and 222-*n*B and 222-(*n*+1) may be referred to as a serial output circuit 222 or serial output circuits 222 when not distinguished from one another. Unlike the signal output block 22, the reference signal output block 23 includes one set for the data signal input system for acquiring the data signal from the transmission signal generation unit 10, one set for the delay control signal input system for acquiring the delay control signal from the phase correction unit 21, and one set for the amplitude control signal input system for acquiring the amplitude control signal from the phase correction unit 21.

The bit delay unit 221-(*n*+1) is a circuit capable of delaying the data signal acquired from the transmission signal generation unit 10 by one bit or more in units of one bit on the basis of the delay control signal from the phase correction unit 21, that is, the control of the phase correction unit 21. The bit delay unit 221-(*n*+1) outputs the delayed data signal to the serial output circuit 222-(*n*+1).

The serial output circuit 222-(*n*+1) is a circuit capable of changing the amplitude of the delayed data signal acquired from the bit delay unit 221-(*n*+1) on the basis of the amplitude control signal from the phase correction unit 21, that is, the control of the phase correction unit 21. The serial output circuit 222-(*n*+1) outputs, as a reference serial signal, the serial signal obtained by controlling the amplitude of the data signal to the reference signal distribution unit 24. The reference serial signal may be simply referred to as a reference signal case by case.

Note that in the example of FIG. 1, the output signal generation device 20 includes one reference signal output block or circuitry 23, but may include two or more reference signal output blocks or circuitries 23.

Figure 8:
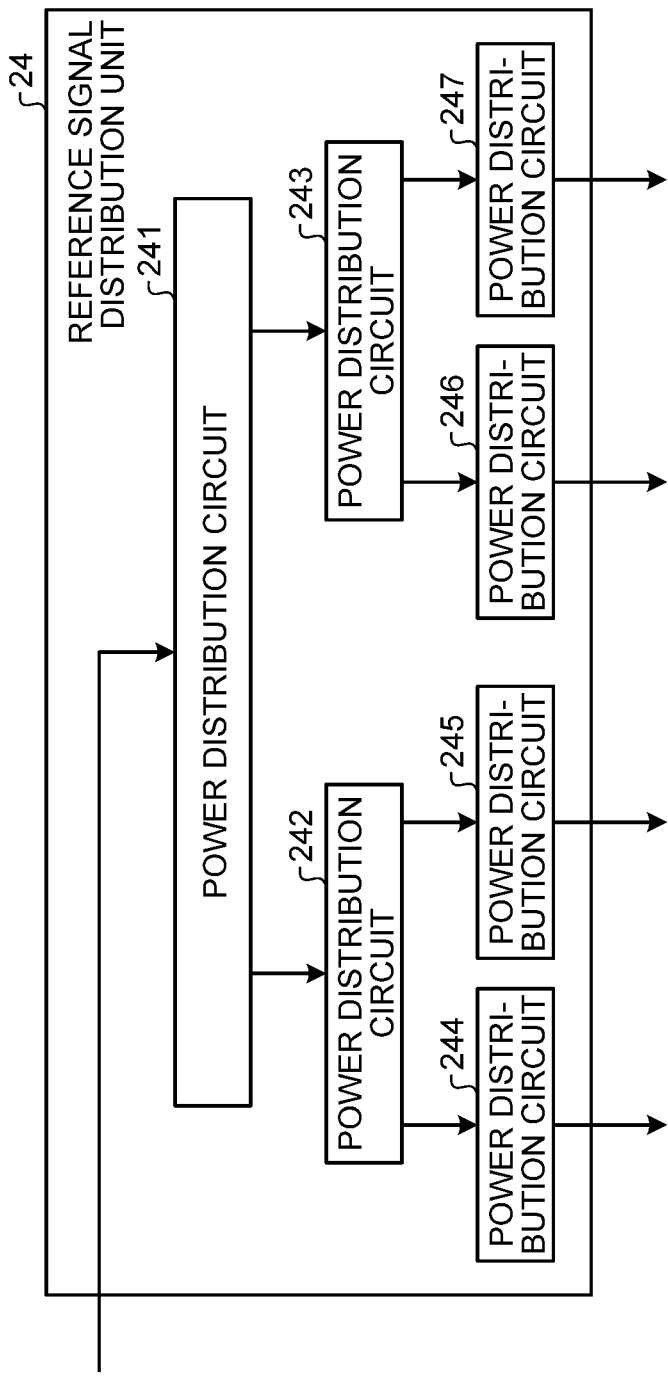
FIG. 8 is a diagram illustrating an example of a configuration of a reference signal distribution unit included in the output signal generation device according to the first embodiment.

The reference signal distribution unit 24 distributes the reference serial signal acquired from the reference signal output block 23. In the example of FIG. 1, the reference signal distribution unit 24 distributes the reference serial signal acquired from the reference signal output block 23 to "n" parts, and outputs one reference serial signal to each of the reference multiplex units 26-1 to 26-*n*. FIG. 8 is a diagram illustrating an example of a configuration of the reference signal distribution unit 24 included in the output signal generation device 20 according to the first embodiment. As illustrated in FIG. 8, for example, the reference signal distribution unit 24 may be configured by a circuitry such as a power divider, that is, a circuitry in which power distribution circuits 241 to 247 are arranged in a tree shape to perform power distribution, or other circuitries like that. Note that, in a case where the output signal generation device 20 includes two or more reference signal output blocks 23, the number of the reference signal distribution units 24 may be equal to the number of the reference signal output blocks 23.

Each of the signal demultiplex units 25-1 to 25-*n* demultiplexes the second serial signal acquired from the corresponding signal output block 22. Specifically, the signal demultiplex unit 25-1 outputs the second serial signal acquired from the signal output block 22-1 to the analog front end 40-1 and the reference multiplex unit 26-1. Likewise, the signal demultiplex unit 25-*n* outputs the second serial signal acquired from the signal output block 22-*n* to the analog front end 40-*n* and the reference multiplex unit 26-*n*. The signal demultiplex units 25-1 to 25-*n* are implemented by a circuit element that distributes electric power at a specified ratio, such as a resistor-based power divider, a Wilkinson divider, or a directional coupler, for example. In the following description, the signal demultiplex units 25-1 to 25-*n* may be referred to as a signal demultiplex unit or demultiplexer 25 or signal demultiplex units or demultiplexers 25 when not distinguished from one another.

Each of the reference multiplex units 26-1 to 26-*n* electrically multiplexes the reference serial signal acquired from the reference signal distribution unit 24 and the demultiplexed second serial signal acquired from the corresponding signal demultiplex unit 25. The reference multiplex units 26-1 to 26-*n* are realized by a circuit element that combines electric powers at a certain ratio, such as a resistor-based power combiner or a Wilkinson divider, for example. The reference multiplex units 26-1 to 26-*n* each output a third serial signal that is a serial signal obtained by the multiplex, to the switching unit 27. In the following description, the reference multiplex units 26-1 to 26-*n* may be referred to as a reference multiplex unit or multiplexer 26 or reference multiplex units or multiplexers 26 when not distinguished from one another.

The switching unit 27 acquires the third serial signals, that is, "n" third serial signals from the reference multiplex units 26-1 to 26-*n*. The switching unit 27 selects which third serial signal acquired from the reference multiplex unit 26 is to be outputted to the level measurement unit 28 on the basis of a switching signal that is a control signal from the phase correction unit 21. For example, in a case where the reference multiplex unit 26-1 is subjected to setting by the switching signal from the phase correction unit 21, the switching unit 27 selects the third serial signal acquired from the reference multiplex unit 26-1 and outputs the third serial signal to the level measurement unit 28. The switching unit 27 is realized by, for example, a switch made of a semiconductor or a mechanical component.

Figure 9:
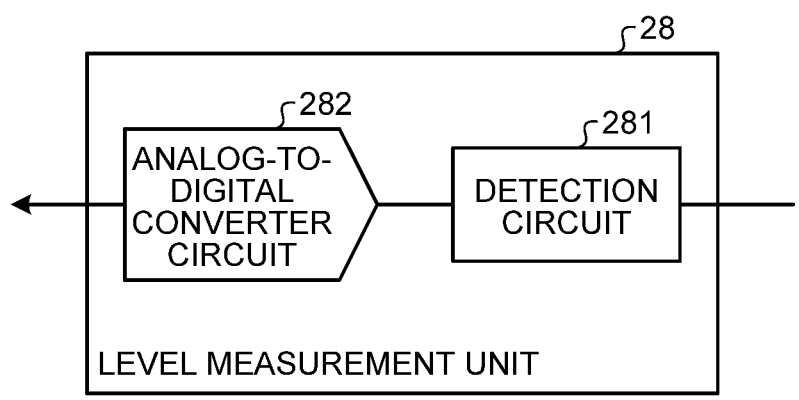
FIG. 9 is a diagram illustrating an example of a configuration of a level measurement unit included in the output signal generation device according to the first embodiment.

The level measurement unit 28 measures electric power or amplitude as an output level of the third serial signal acquired from the switching unit 27. The level measurement unit 28 outputs a level signal indicating a measured value of the output level of the third serial signal to the phase correction unit 21. FIG. 9 is a diagram illustrating an example of a configuration of the level measurement unit 28 included in the output signal generation device 20 according to the first embodiment. As illustrated in FIG. 9, the level measurement unit 28 includes a detection circuit 281 and an analog-to-digital converter circuit 282. The detection circuit 281 measures the electric power or amplitude of the third serial signal. The analog-to-digital converter circuit 282 converts the measured value of the detection circuit 281 into a form that can be handled by the phase correction unit 21, that is, converts the measured value from an analog form into a digital form, and outputs the resultant value as a level signal. Note that the level measurement unit 28 only needs to be able to measure an average electric power or amplitude of the third serial signal, and may have a configuration other than the circuit configuration illustrated in FIG. 9. For example, the level measurement unit 28 may be configured to sample the third serial signal that is a high-frequency signal directly by a high-speed analog-to-digital converter circuit, and obtain the average power or amplitude by signal processing in the FPGA.

In the n-element array antenna transmitter 60, as illustrated in FIG. 1, the analog front end 40 acquires the second serial signal that is a serial signal from the corresponding signal demultiplex unit 25. The analog front end 40 performs filter processing, amplification processing, and the like on the second serial signal and transmits the thereby-obtained second serial signal via the corresponding antenna element 50.

As described above, in the output signal generation device 20, the signal demultiplex unit 25 supplies a part of the second serial signal generated in the signal output block 22 to the reference demultiplex unit 26, and supplies the remaining part of the second serial signal to the antenna element 50 via the analog front end 40.

Note that, as illustrated in FIG. 1, the phase correction unit 21, the bit delay unit 221, and the serial output circuit 222 in the output signal generation device 20 are configured inside the FPGA, that is, by the FPGA. The signal multiplex unit 223, the reference signal distribution unit 24, the signal demultiplex unit 25, the reference multiplex unit 26, the switching unit 27, and the level measurement unit 28 in the output signal generation device 20 are configured outside the FPGA, that is, by an analog circuit or the like. As illustrated in FIG. 1, the configuration inside the FPGA is on the left side of a dotted line, and the configuration outside the FPGA is on the right side of the dotted line. The similar representation applies to diagrams for configuration examples of embodiments described later.

Figure 10:
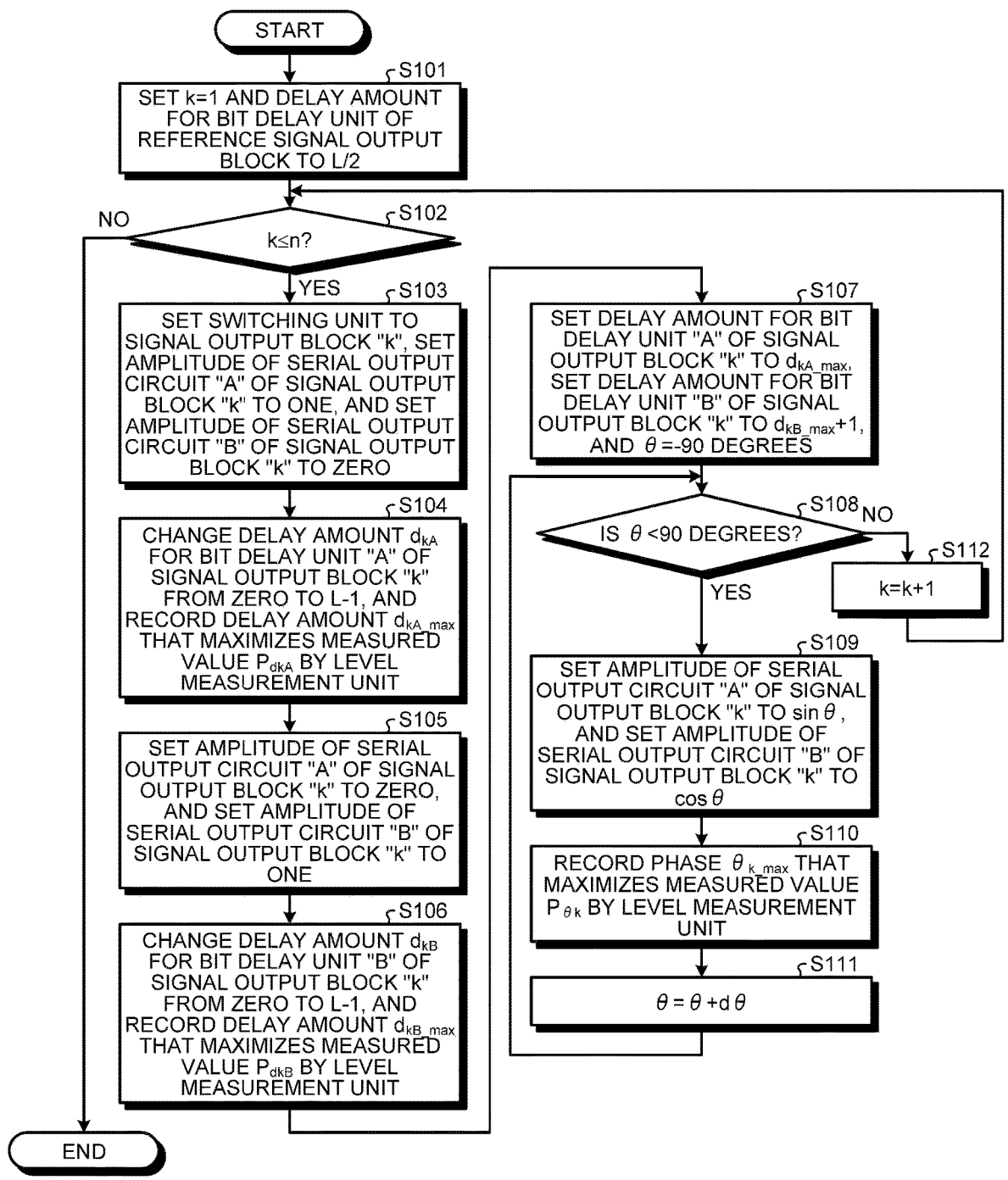
FIG. 10 is a flowchart illustrating an example of an operation at the time of zero point matching of an output signal phase of each signal output block in a phase correction unit included in the output signal generation device according to the first embodiment.

The phase correction unit 21 controls the delay control signal and the amplitude control signal to be outputted to each signal output block 22 on the basis of zero point matching of the phase of the second serial signal outputted from each signal output block 22, that is, the output signal phase; antenna phase settings ($\phi_1$ to $\phi_n$) for the antenna elements 50-1 to 50-*n* acquired from the outside; and the like. The phase correction unit 21 further controls the phases of the second serial signals outputted from two or more signal output blocks 22 on the basis of the output level, that is, the measured value of the third serial signal measured by the level measurement unit 28. FIG. 10 is a flowchart illustrating an example of an operation at the time of zero point matching of the output signal phases of signal output blocks 22 in the phase correction unit 21 included in the output signal generation device 20 according to the first embodiment.

As illustrated in the flowchart of FIG. 10, as a first step, the phase correction unit 21 searches for a delay amount $d_{kA\_max}$ that is a set value for the bit delay unit 221-*k*A such that an output timing of the serial output circuit 222-*k*A of the signal output block 22-*k* and an output timing of the reference signal output block 23 match each other as much as possible. Next, the phase correction unit 21 searches for a delay amount $d_{kB\_max}$ that is a set value for the bit delay unit 221-*k*B such that an output timing of the serial output circuit 222-*k*B of the signal output block 22-*k* and an output timing of the reference signal output block 23 match each other as much as possible. Finally, the phase correction unit 21 searches for a phase $\theta_{k\_max}$ such that the second serial signal outputted from the signal output block 22-*k* and the reference serial signal outputted from the reference signal output block 23 match each other as much as possible. The phase correction unit 21 performs the above search operations by searching for a point at which the measured value obtained by the level measurement unit 28 is maximum.

In FIG. 10, "$d\theta$" represents a search resolution at the time of searching for the phase $\theta_{k\_max}$. For example, when performing the search in units of one degree, the phase correction unit 21 sets $d\theta=1$ and conducts a process of the flowchart illustrated in FIG. 10. Also in FIG. 10, in order to simplify the description, the signal output block 22-*k* is abbreviated to a signal output block or circuitry "k". More-over, as described above, the bit delay units 221-*k*A and 221-*k*B are abbreviated to the bit delay units A and B, respectively, and the serial output circuits 222-*k*A and 222-*k*B are abbreviated to the serial output circuits A and B, respectively. Similar expression applies to the subsequent drawings and description.

Specifically, the phase correction unit 21 sets k=1 and sets the delay amount for the bit delay unit 221-(*n*+1) of the reference signal output block 23 to L/2 (step S101). Note that "L" is the number of bits of the data signal outputted from the transmission signal generation unit 10. If k≤n (Yes in step S102), the phase correction unit 21 sets connection of the switching unit 27 to the signal output block 22-*k*. The phase correction unit 21 sets the amplitude of the serial output circuit 222-*k*A of the signal output block 22-*k* to one, and sets the amplitude of the serial output circuit 222-*k*B of the signal output block 22-*k* to zero (step S103). The phase correction unit 21 changes a delay amount $d_{kA}$ for the bit delay unit 221-*k*A of the signal output block 22-*k* from zero to L−1, and records the delay amount $d_{kA\_max}$ at which a measured value $P_{dkA}$ of the level measurement unit 28 becomes the maximum (step S104). The phase correction unit 21 sets the amplitude of the serial output circuit 222-*k*A of the signal output block 22-*k* to zero, and sets the amplitude of the serial output circuit 222-*k*B of the signal output block 22-*k* to one (step S105). The phase correction unit 21 changes a delay amount $d_{kB}$ for the bit delay unit 221-*k*B of the signal output block 22-*k* from zero to L−1, and records the delay amount $d_{kB\_max}$ at which a measured value $P_{dkB}$ by the level measurement unit 28 becomes the maximum (step S106).

The phase correction unit 21 sets $d_{kA\_max}$ as the delay amount for the bit delay unit 221-*k*A of the signal output block 22-*k*, sets $d_{kB\_max}+1$ as the delay amount for the bit delay unit 221-*k*B of the signal output block 22-*k*, and sets θ=−90 degrees (step S107). If θ<90 degrees (Yes in step S108), the phase correction unit 21 sets the amplitude of the serial output circuit 222-*k*A of the signal output block 22-*k* to sin θ, and sets the amplitude of the serial output circuit 222-*k*B of the signal output block 22-*k* to cos θ (step S109). The phase correction unit 21 records the phase $\theta_{k\_max}$ at which a measured value $P_{\theta k}$ of the level measurement unit 28 becomes the maximum (step S110). The phase correction unit 21 increments the value of θ as with θ=θ+dθ (step S111). The phase correction unit 21 returns to step S108 and repeats the operations of step S109 to step S111 until θ≥90 degrees. If θ≥90 degrees (No in step S108), the phase correction unit 21 increments the value of "k" as with k=k+1 (step S112). The phase correction unit 21 returns to step S102 and repeats the operations of step S103 to step S112 until k>n. If k>n (No in step S102), the phase correction unit 21 ends the operation of the flowchart illustrated in FIG. 10.

As described above, when controlling the delay control signal and the amplitude control signal to be outputted to each signal output block 22 on the basis of the antenna phase settings ($\phi_1$ to $\phi_n$) inputted from the outside, the phase correction unit 21 uses the delay amounts $d_{kA\_max}$ and $d_{kB\_max}$ and the phase $\theta_{k\_max}$ acquired by the control for zero point matching. Specifically, the phase correction unit 21 sets the delay amount for the bit delay unit 221-*k*A of the signal output block 22-*k* to $d_{kA\_max}$, the delay amount for the bit delay unit 221-*k*B thereof to $d_{kB\_max}$, and the amplitude ratio of the serial output circuits 222-*k*A and 222-*k*B to sin($\theta_{k\_max}+\phi_k$):cos($\theta_{k\_max}+\phi_k$).

As described above, the output signal generation device 20 includes two or more signal output blocks 22 and the phase correction unit 21. The signal output block 22 includes: two or more bit delay units or circuits 221 that can each delay the data signal by one bit or more and output the delayed data signal to the corresponding serial output circuit 222; two or more serial output circuits 222 that each output the first serial signal with controlling the amplitudes of the data signals having different delay times; and the signal multiplex unit 223 that electrically multiplexes the first serial signals outputted from the two or more serial output circuits 222. The phase correction unit 21 controls the phase of the second serial signal outputted from each of the two or more signal output blocks 22 based on change in amplitude of the first serial signal outputted from the serial output circuit 222. The phase correction unit 21 controls the phase of the second serial signal outputted from each of the two or more signal output blocks 22 further based on the number of delay bits in the bit delay unit 221.

Note that in the output signal generation device 20, the signal output block 22 can be configured not to include any bit delay unit 221. For example, the phase correction unit 21 may control the phase of the second serial signal outputted from each of the two or more signal output blocks 22 further based on change in phase of a reference clock in the serial output circuit 222. Alternatively, with the signal output block 22 including the bit delay unit 221, the phase correction unit 21 may realize the control further based on change in phase of the reference clock in the serial output circuit 222. In this case, the phase correction unit 21 controls the phase of the second serial signal outputted from each of the two or more signal output blocks 22 further based on the number of delay bits in the bit delay unit 221 and based on change in phase of the reference clock in the serial output circuit 222.

Next, a hardware configuration of the output signal generation device 20 will be described. In the output signal generation device 20, the configuration other than the phase correction unit 21 is implemented by the circuit configuration as described above. The phase correction unit 21 is implemented by a processing circuit. The processing circuit is built in the FPGA, and may be configured based on a memory and a processor executing a program stored in the memory, or may be configured by dedicated hardware. The processing circuit is also called a control circuit.

Figure 11:
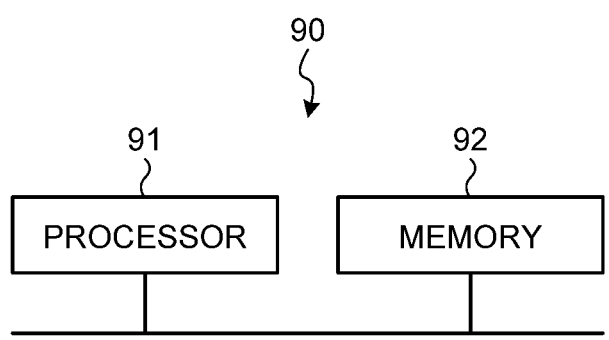
FIG. 11 is a diagram illustrating an example of a configuration of a processing circuit in a case where the processing circuit included in the output signal generation device according to the first embodiment is implemented by a processor and a memory.

FIG. 11 is a diagram illustrating an example of a configuration of a processing circuit 90 in a case where the processing circuit included in the output signal generation device 20 according to the first embodiment is implemented by a processor 91 and a memory 92. The processing circuit 90 illustrated in FIG. 11 is a control circuit and includes the processor 91 and the memory 92. In the case where the processing circuit 90 is composed of the processor 91 and the memory 92, each function of the processing circuit 90 is implemented by software, firmware, or a combination of software and firmware. The software or firmware is described as a program and stored in the memory 92. The processing circuit 90 carries out each function by the processor 91 reading and executing the program stored in the memory 92. That is, the processing circuit 90 includes the memory 92 for storing the program that results in the execution of the processing of the output signal generation device 20. It can also be said that this program is a program for causing the output signal generation device 20 to execute each function to be implemented by the processing circuit 90. This program may be provided by a storage medium in which the program has been stored, or may be provided by other means such as a communication medium.

It can also be said that the above-mentioned program is a program that causes the output signal generation device 20 to execute: a first step in which two or more signal output blocks 22 output the second serial signal electrically multiplexed by the signal multiplex unit 223, the signal output blocks 22 each including two or more serial output circuits 222 that control amplitudes of data signals having different delay times and each output the first serial signal, and the signal multiplex unit 223 that electrically multiplexes the first serial signals outputted from the two or more serial output circuits 222; and a second step in which the phase correction unit 21 controls the phase of the second serial signals outputted from the two or more signal output blocks 22 based on change in amplitude of the first serial signals outputted from the serial output circuits 222.

Here, the processor 91 is, for example, a central processing unit (CPU), a processing device, an arithmetic device, a microprocessor, a microcomputer, a digital signal processor (DSP), or the like. The memory 92 corresponds to: for example, a non-volatile or volatile semiconductor memory such as a random access memory (RAM), a read only memory (ROM), a flash memory, an erasable programmable ROM (EPROM), or an electrically EPROM (EEPROM (registered trademark)); a magnetic disk; a flexible disk; an optical disk; a compact disc; a mini disc; a digital versatile disc (DVD); or the like.

Figure 12:
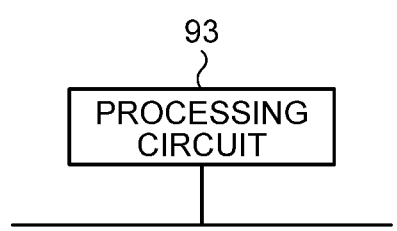
FIG. 12 is a diagram illustrating an example of a processing circuit in a case where the processing circuit included in the output signal generation device according to the first embodiment is configured by dedicated hardware.

FIG. 12 is a diagram illustrating an example of a processing circuit 93 in a case where the processing circuit included in the output signal generation device 20 according to the first embodiment is configured by dedicated hardware. The processing circuit 93 illustrated in FIG. 12 corresponds to, for example, a single circuit, a composite circuit, a programmed processor, a parallel-programmed processor, an application specific integrated circuit (ASIC), an FPGA, or a combination thereof. The processing circuitry may be implemented partly by dedicated hardware and partly by software or firmware. As just described, the processing circuit can implement the aforementioned functions by using the dedicated hardware, software, firmware, or a combination thereof.

As described above, according to the present embodiment, the output signal generation device 20 uses the serial output circuits 222 for two systems, outputs the first serial signals having the delay difference of one bit from the serial output circuits 222 for the two systems with different amplitudes, multiplexes the first serial signals for the two systems, and outputs the multiplexed signals as the second serial signal. The output signal generation device 20 can obtain a plurality of signals having desired phase differences by virtue of using, as a criterion, the bit delay amount and the amplitude ratio at which the amplitude of the third serial signal is the maximum, the third serial signal being obtained by multiplexing: the second serial signal in which the first serial signals for the two systems have been multiplexed; and the reference serial signal outputted from the reference signal output block 23. The output signal generation device 20 can improve the accuracy in adjustment of the phase of each serial signal when outputting the plurality of serial signals.

In the present embodiment, with utilization of the fact that the one-bit delay corresponds to the 90-degree phase difference at the frequency of fs/4, the output signal generation device 20 multiplexes the two data signals having the one-bit delay difference, whose amplitudes have been controlled, and outputs the multiplexed signals as the serial signal, thereby enabling phase adjustment of less than one UI. Moreover, the output signal generation device 20 performs the phase adjustment on the basis of the output level of the third serial signal obtained by multiplexing the second serial signal outputted from the signal output block 22 and the reference serial signal, thereby enabling phase correction of each serial output circuit 222. Furthermore, the output signal generation device 20 can reduce the number or size of analog circuits outside the FPGA, and can control and correct the phase between the serial output signals with a smaller number of components.

Second Embodiment

In the first embodiment, the analog front end 40 in the n-element array antenna transmitter 60 is situated outside the output signal generation device 20. A second embodiment is presented for description of a case where an output signal generation device includes some of analog front ends.

Figure 13:
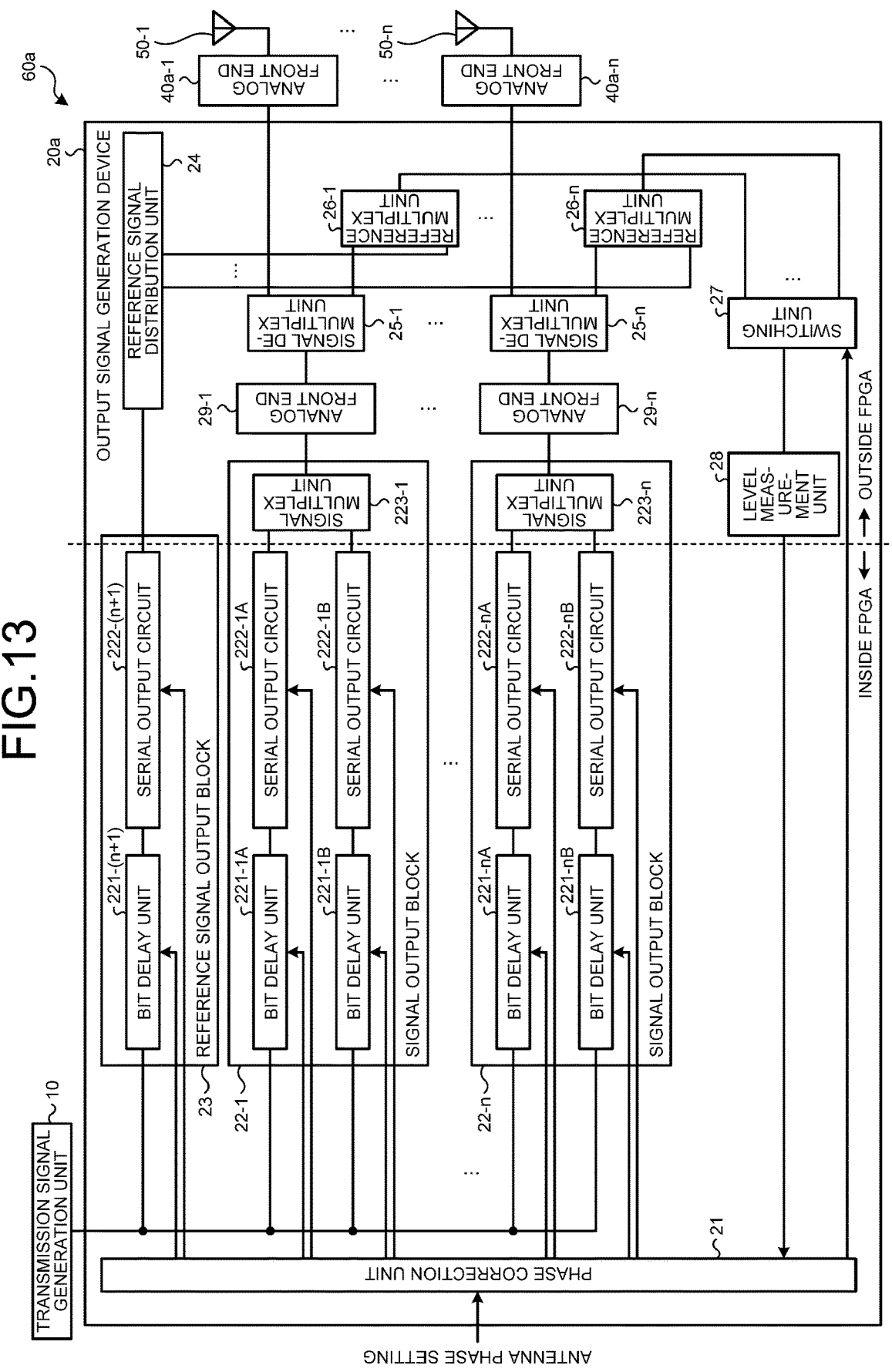
FIG. 13 is a diagram illustrating an example of a configuration of an n-element array antenna transmitter including an output signal generation device according to a second embodiment.

FIG. 13 is a diagram illustrating an example of a configuration of an n-element array antenna transmitter 60a including an output signal generation device 20a according to the second embodiment. The n-element array antenna transmitter 60a has a configuration obtained by replacing the output signal generation device 20 and the analog front ends 40-1 to 40-n of the n-element array antenna transmitter 60 of the first embodiment illustrated in FIG. 1 with the output signal generation device 20a and analog front ends 40a-1 to 40a-n. The output signal generation device 20a has a configuration obtained by adding analog front ends 29-1 to 29-n to the output signal generation device 20 of the first embodiment illustrated in FIG. 1. In the following description, the analog front ends 40a-1 to 40a-n may be referred to as an analog front end 40a or analog front ends 40a when not distinguished from one another, and the analog front ends 29-1 to 29-n may be referred to as an analog front end 29 or analog front ends 29 when not distinguished from one another.

In the second embodiment, a part of the function for the analog front ends 40 of the first embodiment illustrated in FIG. 1 is relocated to a stage preceding the signal demultiplex unit 25 of the output signal generation device 20a, as the analog front ends 29. That is, a combination of the function of the analog front ends 29 and the function of the analog front ends 40a illustrated in FIG. 13 corresponds to the function of the analog front ends 40 of the first embodiment illustrated in FIG. 1. In the second embodiment, by adopting the configuration as illustrated in FIG. 13, the output signal generation device 20a can remove part of a phase error caused by variation in analog characteristics existing in the analog front ends 40 of the first embodiment, by performing the operation of the flowchart illustrated in FIG. 10. From the analog front ends 40, for example, an amplifier, a filter, or the like corresponds to a circuit element to be relocated to the stage preceding the signal demultiplex unit 25, for the analog front ends 29.

As described above, according to the present embodiment, the output signal generation device 20a is configured to include the analog front ends 29 at the stage preceding the signal demultiplex units 25. As a result, the output signal generation device 20a can remove a part of the phase error caused by the variation in analog characteristics existing in the analog front end 40 of the first embodiment.

Third Embodiment

A third embodiment is presented for description of a case where an output signal generation device includes a bit inversion unit in a stage preceding the reference signal output block 23. Note that although the third embodiment can be applied to the first embodiment and the second embodiment, the description presented herein will be made using the first embodiment as an example.

Figure 14:
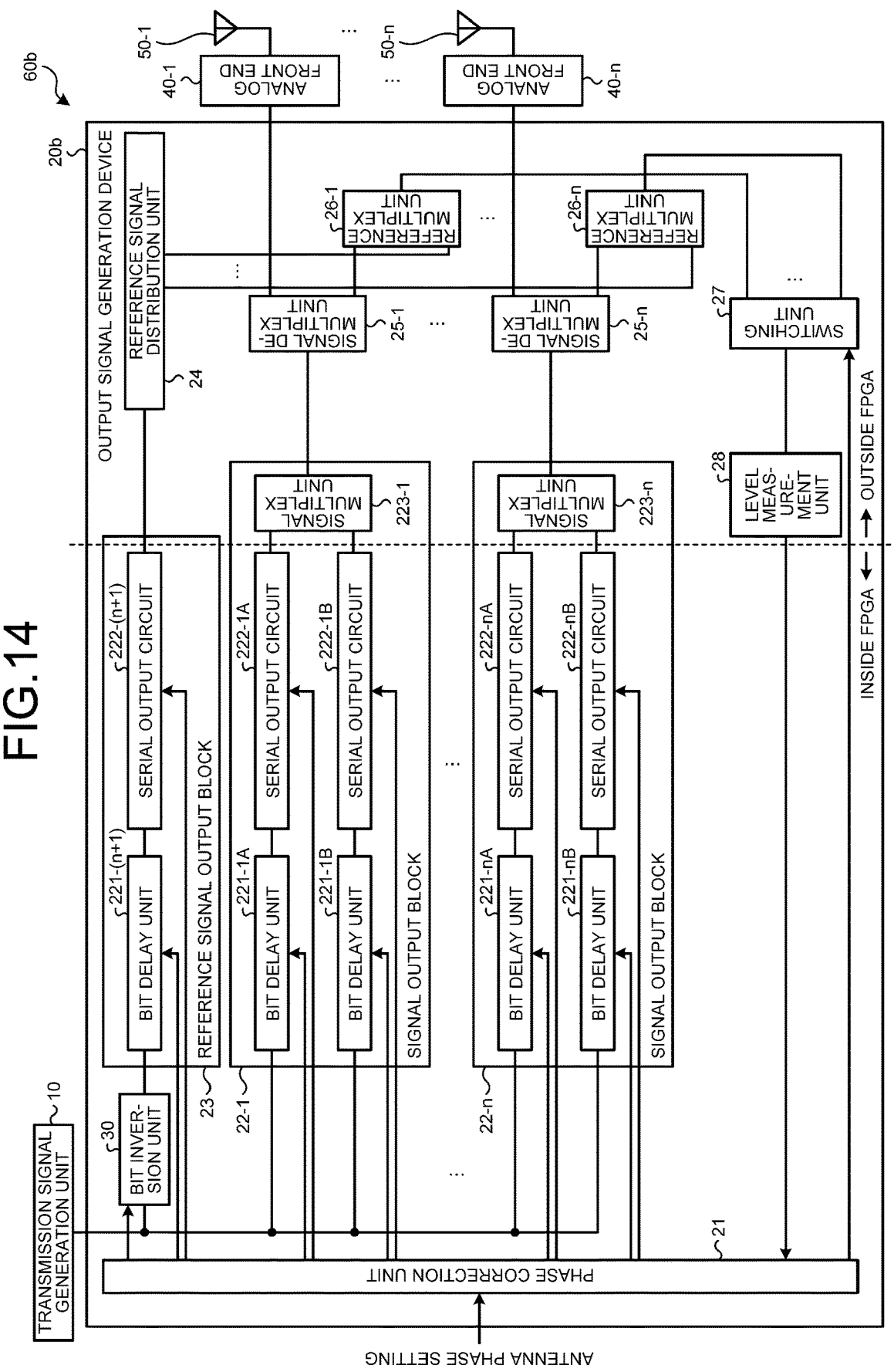
FIG. 14 is a diagram illustrating an example of a configuration of an n-element array antenna transmitter including an output signal generation device according to a third embodiment.

FIG. 14 is a diagram illustrating an example of a configuration of an n-element array antenna transmitter 60b including an output signal generation device 20b according to the third embodiment. The n-element array antenna transmitter 60b has a configuration obtained by replacing the output signal generation device 20 of the n-element array antenna transmitter 60 of the first embodiment illustrated in FIG. 1 with the output signal generation device 20b. The output signal generation device 20b has a configuration obtained by adding a bit inversion unit or inverter 30 to the output signal generation device 20 of the first embodiment illustrated in FIG. 1. The bit inversion unit 30 is installed in the stage preceding the reference signal output block 23, controls bit inversion of the data signal acquired from the transmission signal generation unit 10 on the basis of a bit inversion signal from the phase correction unit 21, that is, the control of the phase correction unit 21, and outputs the resultant data signal to the reference signal output block 23. The reference signal output block 23 is connected to the transmission signal generation unit 10 via the bit inversion unit 30, and acquires the data signal from the transmission signal generation unit 10 via the bit inversion unit 30.

In a case where the bit inversion signal indicates inversion, the reference signal output block 23 acquires the data signal whose bits have been inverted as compared to the cases of the first embodiment and the second embodiment. In this case, the reference signal output block 23 outputs the reference serial signal whose bits have been inverted as compared to the cases of the first embodiment and the second embodiment. Note that in a case where the bit inversion signal indicates non-inversion, the reference signal output block 23 acquires the same data signal as that of the first embodiment and the second embodiment. In this case, the reference signal output block 23 outputs the same reference serial signal as that of the first embodiment and the second embodiment.

Figure 15:
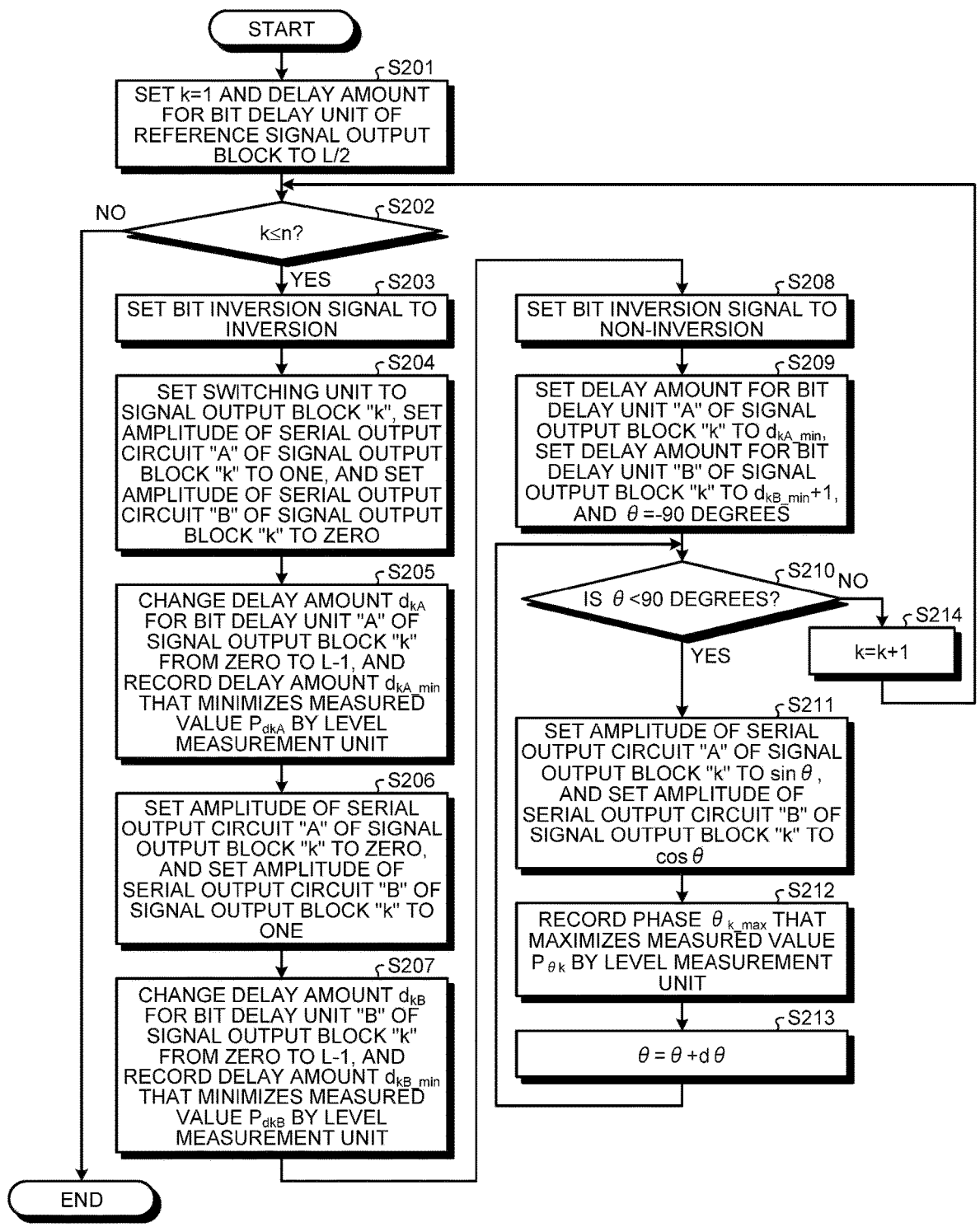
FIG. 15 is a flowchart illustrating an example of an operation at the time of zero point matching of an output signal phase of each signal output block in the phase correction unit included in the output signal generation device according to the third embodiment.

FIG. 15 is a flowchart illustrating an example of an operation at the time of zero point matching of the output signal phase of each signal output block 22 in the phase correction unit 21 included in the output signal generation device 20b according to the third embodiment. As illustrated in FIG. 15, in the third embodiment, when searching for delay amounts $d_{kA\_min}$ and $d_{kB\_min}$ for the bit delay unit 221, the phase correction unit 21 enables bit inversion of the bit inversion unit 30 and searches for a point at which a measured value of the level measurement unit 28 is minimum. Furthermore, when searching for the phase $\theta_{k\_max}$, the phase correction unit 21 disables bit inversion of the bit inversion unit 30 and searches for a point at which a measured value of the level measurement unit 28 is maximum.

Specifically, the phase correction unit 21 sets k=1 and sets the delay amount for the bit delay unit 221-(n+1) of the reference signal output block 23 to L/2 (step S201). If k≤n (Yes in step S202), the phase correction unit 21 sets the bit inversion signal for the bit inversion unit 30 to inversion (step S203). The phase correction unit 21 sets connection of the switching unit 27 to the signal output block 22-k, sets the amplitude of the serial output circuit 222-kA of the signal output block 22-k to one, and sets the amplitude of the serial output circuit 222-kB of the signal output block 22-k to zero (step S204). The phase correction unit 21 changes the delay amount $d_{kA}$ of the bit delay unit 221-kA of the signal output block 22-k from zero to L−1, and records the delay amount $d_{kA\_min}$ at which the measured value $P_{dkA}$ of the level measurement unit 28 becomes the minimum (step S205). The phase correction unit 21 sets the amplitude of the serial output circuit 222-$k$A of the signal output block 22-$k$ to zero, and sets the amplitude of the serial output circuit 222-$k$B of the signal output block 22-$k$ to one (step S206). The phase correction unit 21 changes the delay amount $d_{kB}$ for the bit delay unit 221-$k$B of the signal output block 22-$k$ from zero to L−1, and records the delay amount $d_{kB\_min}$ at which the measured value $P_{dkB}$ of the level measurement unit 28 becomes the minimum (step S207).

The phase correction unit 21 sets the bit inversion signal for the bit inversion unit 30 to non-inversion (step S208). The phase correction unit 21 sets $d_{kA\_min}$ as the delay amount for the bit delay unit 221-$k$A of the signal output block 22-$k$, sets $d_{kB\_min}$+1 as the delay amount for the bit delay unit 221-$k$B of the signal output block 22-$k$, and sets θ=−90 degrees (step S209). If θ<90 degrees (Yes in step S210), the phase correction unit 21 sets the amplitude of the serial output circuit 222-$k$A of the signal output block 22-$k$ to sin θ, and sets the amplitude of the serial output circuit 222-$k$B of the signal output block 22-$k$ to cos θ (step S211). The phase correction unit 21 records the phase $θ_{k\_max}$ at which the measured value $P_{θk}$ of the level measurement unit 28 is maximum (step S212). The phase correction unit 21 increments the value of θ as with θ=θ+dθ (step S213). The phase correction unit 21 returns to step S210 and repeats the operations from step S211 to step S213 until θ≥90 degrees. If θ≥90 degrees (No in step S210), the phase correction unit 21 increments the value of "k" as with k=k+1 (step S214). The phase correction unit 21 returns to step S202 and repeats the operations from step S203 to step S214 until k>n. If k>n (No in step S202), the phase correction unit 21 ends the operation of the flowchart illustrated in FIG. 15.

As described above, according to the present embodiment, the output signal generation device 20$b$ includes the bit inversion unit 30 in the stage preceding the reference signal output block 23, and the bit inversion unit 30 inverts or does not invert the data signal acquired from the transmission signal generation unit 10 under the control of the phase correction unit 21, and outputs the data signal to the reference signal output block 23. The output signal generation device 20$b$ can obtain an effect similar to that of the first embodiment even in a case of using a condition different from that of the first embodiment.

Fourth Embodiment

A fourth embodiment is presented for description of a case where a configuration of a reference signal output block or circuitry that outputs a reference serial signal is similar to the configuration of the signal output block 22. Note that although the fourth embodiment can be applied to the first to third embodiments, the description given herein will be made using the first embodiment as an example.

Figure 16:
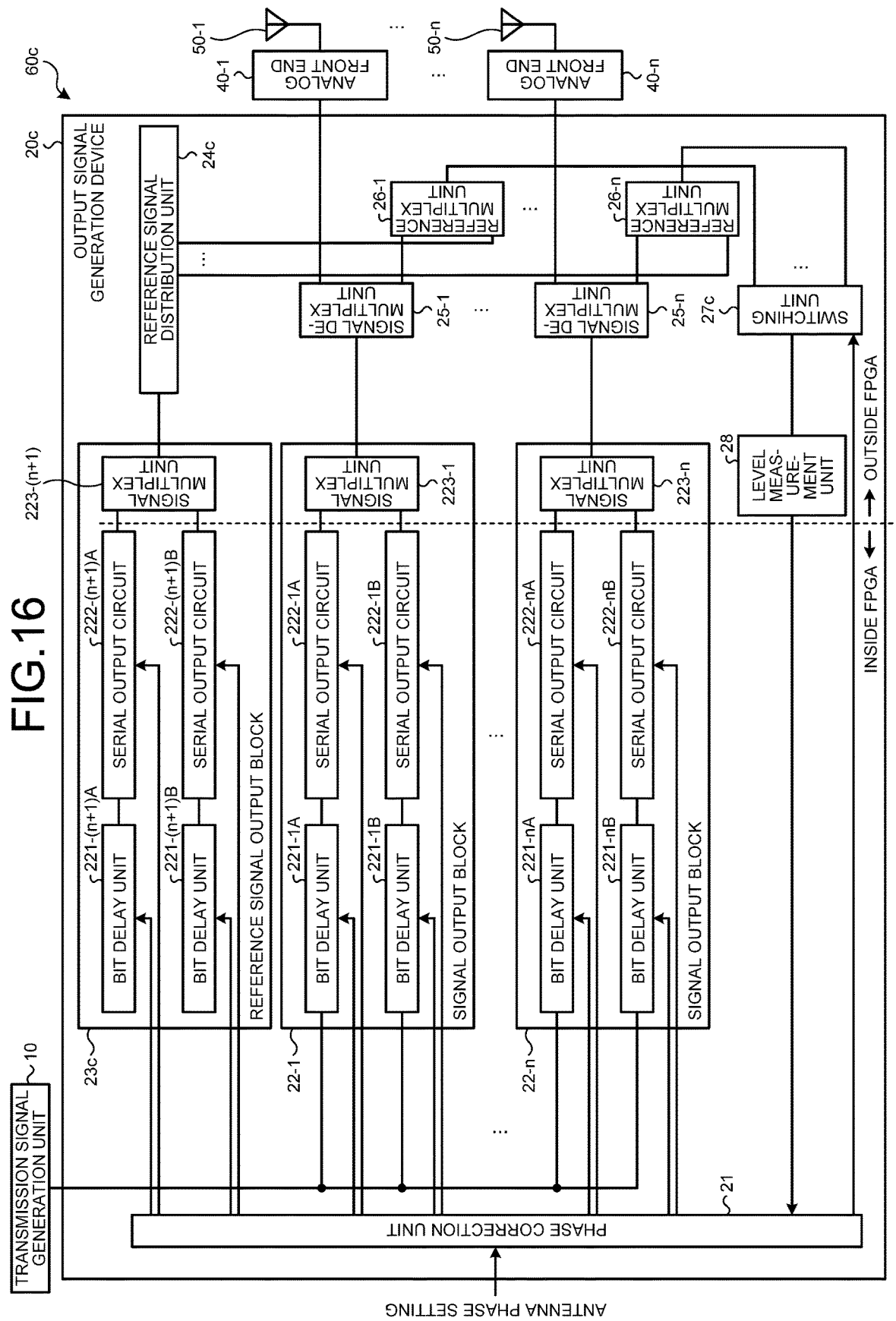
FIG. 16 is a diagram illustrating an example of a configuration of an n-element array antenna transmitter including an output signal generation device according to a fourth embodiment.

FIG. 16 is a diagram illustrating an example of a configuration of an n-element array antenna transmitter 60$c$ including an output signal generation device 20$c$ according to the fourth embodiment. The n-element array antenna transmitter 60$c$ has a configuration obtained by replacing the output signal generation device 20 of the n-element array antenna transmitter 60 of the first embodiment illustrated in FIG. 1 with the output signal generation device 20$c$. The output signal generation device 20$c$ has a configuration obtained by replacing the reference signal output block 23, the reference signal distribution unit 24, and the switching unit 27 of the output signal generation device 20 of the first embodiment illustrated in FIG. 1 with a reference signal output block or circuitry 23$c$, a reference signal distribution unit or distributor 24$c$, and a switching unit 27$c$, respectively.

The reference signal output block 23$c$ includes bit delay units or circuits 221-($n$+1)A and 221-($n$+1)B, serial output circuits 222-($n$+1)A and 222-($n$+1)B, and a signal multiplex unit or multiplexer 223-($n$+1). The reference signal output block 23$c$ thus has the configuration similar to that of the signal output blocks 22. The reference signal output block 23$c$ outputs a serial signal having been electrically subjected to multiplex by the signal multiplex unit 223-($n$+1), as the reference serial signal. The reference signal distribution unit 24$c$ distributes the reference serial signal acquired from the reference signal output block 23$c$ to $n$+1 parts. The reference signal distribution unit 24$c$ distributes the reference serial signal also to the switching unit 27$c$, thereby distributing the reference signals one more than the reference signal distribution unit 24. The switching unit 27$c$ acquires "n" third serial signals from the reference multiplex units 26-1 to 26-$n$ and acquires the reference serial signal from the reference signal distribution unit 24$c$. The switching unit 27$c$ selects one signal to be outputted to the level measurement unit 28, from the "n" third serial signals and the reference serial signal on the basis of the switching signal that is a control signal from the phase correction unit 21.

Note that in the example of FIG. 16, the output signal generation device 20$c$ includes one reference signal output block or circuitry 23$c$, but may include two or more reference signal output blocks or circuitries 23$c$. In a case where the output signal generation device 20$c$ includes two or more reference signal output blocks 23$c$, the number of the reference signal distribution units 24$c$ may be equal to the number of the reference signal output blocks 23$c$.

Figure 17:
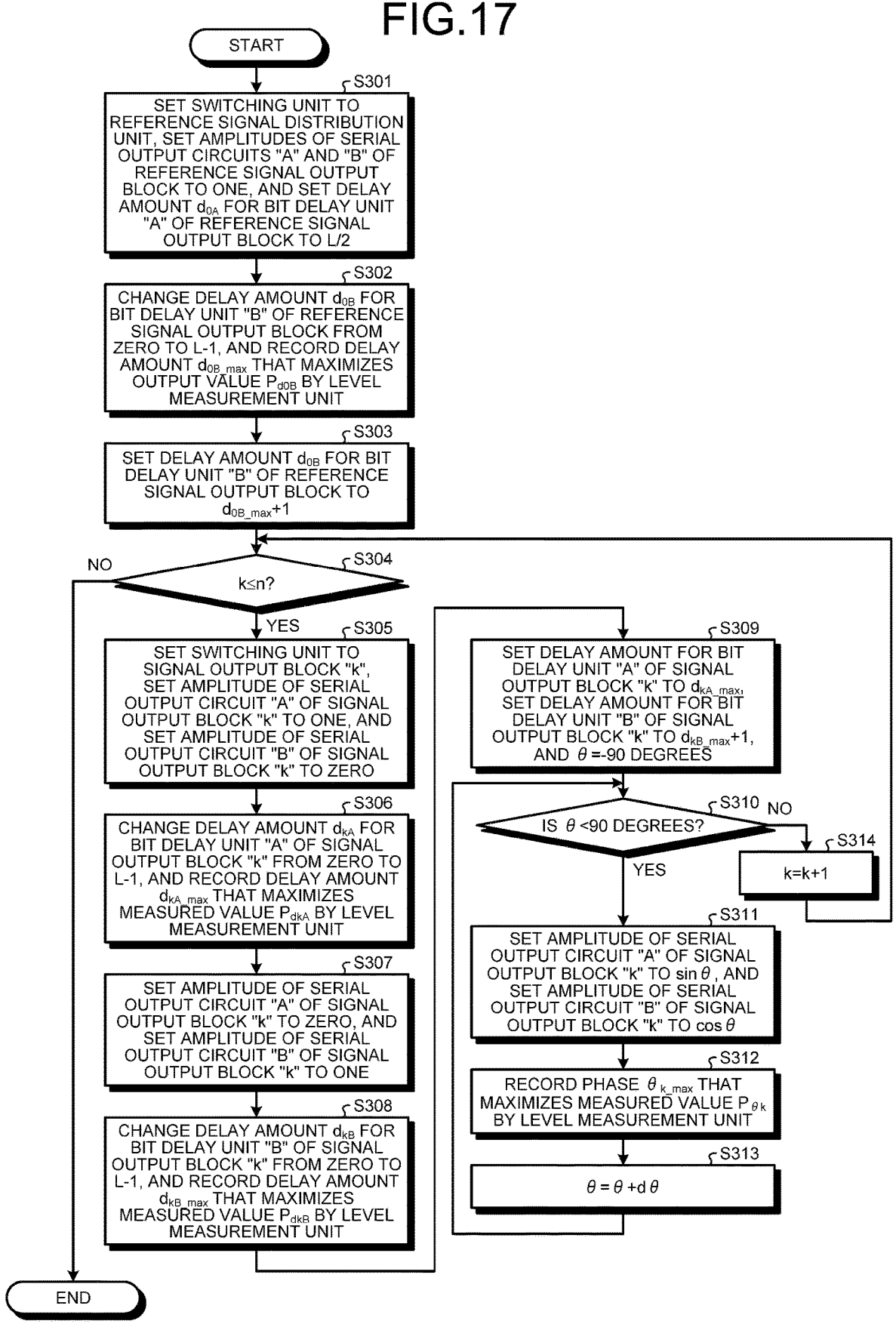
FIG. 17 is a flowchart illustrating an example of an operation at the time of zero point matching of an output signal phase of each signal output block in the phase correction unit included in the output signal generation device according to the fourth embodiment.

FIG. 17 is a flowchart illustrating an example of an operation at the time of zero point matching of an output signal phase of each signal output block 22 in the phase correction unit 21 included in the output signal generation device 20$c$ according to the fourth embodiment. As illustrated in FIG. 17, in the fourth embodiment, the phase correction unit 21 first searches for a delay amount $d_{OB\_max}$ for matching the output signal timings of the serial output circuits 222-$k$A and 222-$k$B of the reference signal output block 23$c$. Note that, in order to simplify the description, FIG. 17 represents the bit delay units 221-($n$+1)A and 221-($n$+1)B of the reference signal output block 23$c$ as the bit delay units A and B, and represents the serial output circuits 222-($n$+1)A and 222-($n$+1)B of the reference signal output block 23$c$ as the serial output circuits A and B. A similar representation manner applies to the subsequent drawings and description.

Specifically, the phase correction unit 21 sets the switching unit 27$c$ to the reference signal distribution unit 24$c$. The phase correction unit 21 sets the amplitudes of the serial output circuits 222-($n$+1)A and 222-($n$+1)B of the reference signal output block 23$c$ to one, and sets a delay amount $d_{oA}$ for the bit delay unit 221-($n$+1)A of the reference signal output block 23$c$ to L/2 (step S301). The phase correction unit 21 changes a delay amount dos for the bit delay unit 221-($n$+1)B of the reference signal output block 23$c$ from zero to L−1, and records the delay amount $d_{OB\_max}$ at which a measured value $P_{dOB}$ of the level measurement unit 28 becomes the maximum (step S302). The phase correction unit 21 sets the delay amount dos for the bit delay unit 221-($n$+1)B of the reference signal output block 23$c$ to $d_{OB\_max}$+1 (step S303). Subsequent operations from step S304 to step S314 are similar to the operations from step S102 to step S112 in the flowchart of the first embodiment illustrated in FIG. 10.

Figure 18:
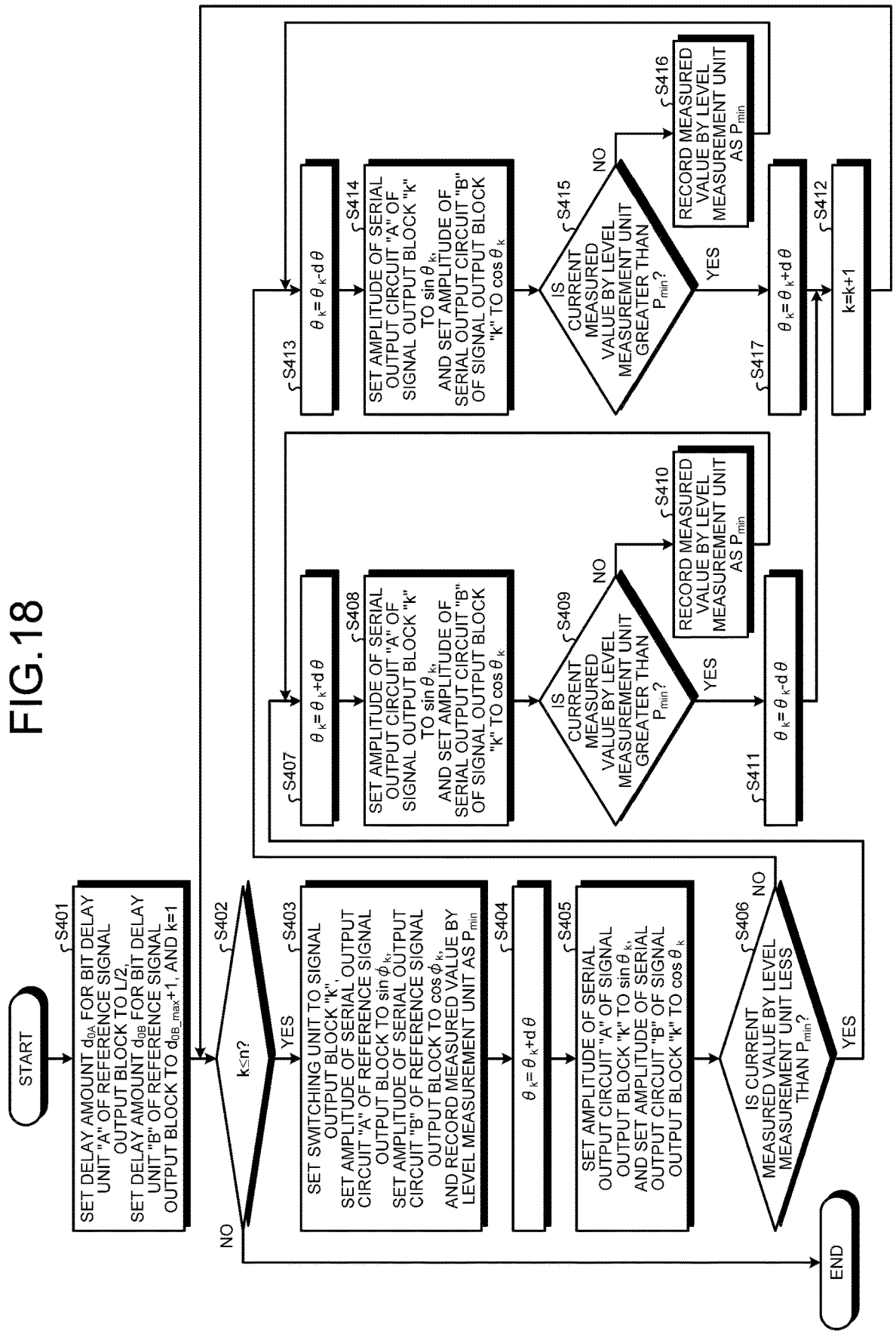
FIG. 18 is a flowchart illustrating an operation when the phase correction unit included in the output signal generation device according to the fourth embodiment calibrates the phase of a second serial signal outputted from each signal output block during the operation of the output signal generation device.

FIG. 18 is a flowchart illustrating an operation when the phase correction unit 21 included in the output signal generation device 20c according to the fourth embodiment calibrates the phase of the second serial signal outputted from each signal output block 22 during the operation of the output signal generation device 20c. For the calibration processing, the phase correction unit 21 sets the phase of the reference serial signal outputted from the reference signal output block 23c on the basis of the antenna phase settings ($\phi_1$ to $\phi_n$), then observes a change in the measured value of the level measurement unit 28 when the phase $\theta_k$ of the second serial signal outputted from each signal output block 22 is shifted by a small angle $d\theta$, and updates the phase $\theta_k$ of the second serial signal in which the measured value is the maximum.

Specifically, the phase correction unit 21 sets the delay amount $d_{OA}$ for the bit delay unit 221-($n$+1)A of the reference signal output block 23c to L/2, and sets the delay amount dos for the bit delay unit 221-($n$+1)B of the reference signal output block 23c to $d_{OB\_max}$+1. The phase correction unit 21 further sets k=1 (step S401). If k≤n (Yes in step S402), the phase correction unit 21 sets connection of the switching unit 27c to the signal output block 22-k. The phase correction unit 21 sets the amplitude of the serial output circuit 222-($n$+1)A of the reference signal output block 23c to sin $\phi_k$, sets the amplitude of the serial output circuit 222-($n$+1)B of the reference signal output block 23c to cos $\phi_k$, and records a measured value Pin of the level measurement unit 28 (step S403). The phase correction unit 21 increments the value of $\theta_k$ as with $\theta k=\theta k+d\theta$ (step S404). The phase correction unit 21 sets the amplitude of the serial output circuit 222-kA of the signal output block 22-k to sin $\theta_k$, and sets the amplitude of the serial output circuit 222-kB of the signal output block 22-k to cos $\theta k$ (step S405).

If the current measured value of the level measurement unit 28 is less than $P_{min}$ (Yes in step S406), the phase correction unit 21 increments the value of $\theta k$ as with $\theta k=\theta_k+d\theta$ (step S407). The phase correction unit 21 sets the amplitude of the serial output circuit 222-kA of the signal output block 22-k to sin $\theta_k$, and sets the amplitude of the serial output circuit 222-kB of the signal output block 22-k to cos $\theta_k$ (step S408). If the current measured value of the level measurement unit 28 is less than or equal to $P_{min}$ (No in step S409), the phase correction unit 21 records the measured value of the level measurement unit 28 as $P_{min}$ (step S410). The phase correction unit 21 performs the operations of steps S407 and S408 again. If the current measured value of the level measurement unit 28 is greater than $P_{min}$ (Yes in step S409), the phase correction unit 21 decrements the value of $\theta_k$ as with $\theta_k=\theta_k-d\theta$ (step S411). Then, the phase correction unit 21 increments the value of "k" as with k=k+1 (step S412).

If the current measured value of the level measurement unit 28 is greater than or equal to $P_{min}$ (No in step S406), the phase correction unit 21 decrements the value of $\theta_k$ as with $\theta_k=\theta_k-d\theta$ (step S413). The phase correction unit 21 sets the amplitude of the serial output circuit 222-kA of the signal output block 22-k to sin $\theta_k$, and sets the amplitude of the serial output circuit 222-kB of the signal output block 22-k to cos $\theta_k$ (step S414). If the current measured value of the level measurement unit 28 is less than or equal to $P_{min}$ (No in step S415), the phase correction unit 21 records the measured value of the level measurement unit 28 as $P_{min}$ (step S416). The phase correction unit 21 performs the operations of steps S413 and S414 again. If the current measured value of the level measurement unit 28 is greater than $P_{min}$ (Yes in step S415), the phase correction unit 21 increments the value of $\theta_k$ as with $\theta_k=\theta_k+d\theta$ (step S417). Then, the phase correction unit 21 increments the value of "k" as with k=k+1 (step S412).

After step S412, the phase correction unit 21 returns to step S402 and repeats the operations from step S403 to step S417 until k>n. If k>n (No in step S402), the phase correction unit 21 ends the operation of the flowchart illustrated in FIG. 18.

As described above, according to the present embodiment, the phase correction unit 21 in the output signal generation device 20c can perform the calibration processing even while the serial signal is being transmitted from the output signal generation device 20c. As a result, the phase correction unit 21 can correct a temporal change of the serial signal outputted from the output signal generation device 20c on an individual basis.

Fifth Embodiment

A fifth embodiment is presented for description of a case where an output signal generation device includes a band-pass filter and a band-stop filter between the switching unit 27 and the level measurement unit 28. Note that although the fifth embodiment can be applied to the first to fourth embodiments, the description presented herein will be made using the first embodiment as an example.

Figure 19:
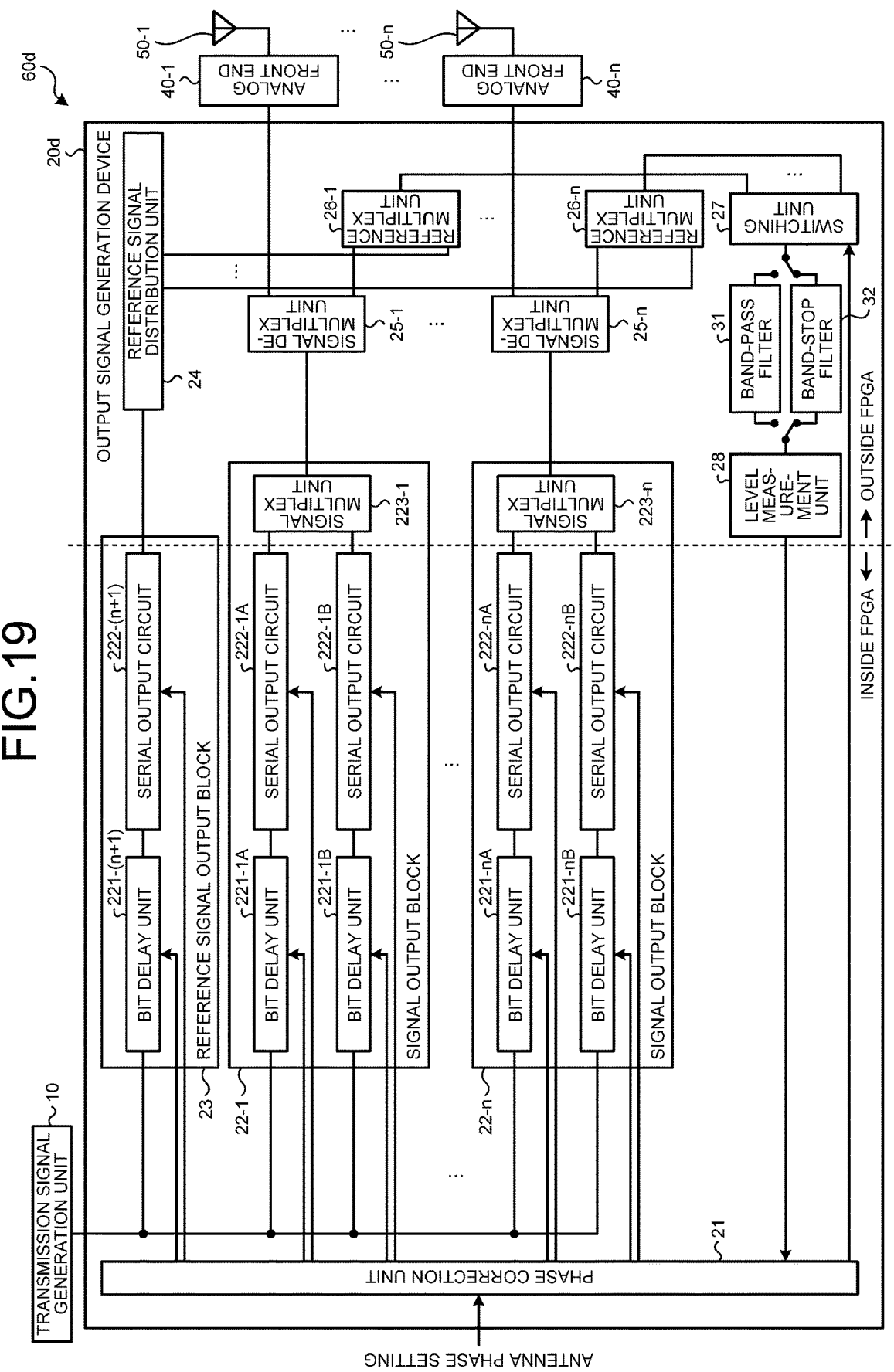
FIG. 19 is a diagram illustrating an example of a configuration of an n-element array antenna transmitter including an output signal generation device according to a fifth embodiment.

FIG. 19 is a diagram illustrating an example of a configuration of an n-element array antenna transmitter 60d including an output signal generation device 20d according to the fifth embodiment. The n-element array antenna transmitter 60d has a configuration obtained by replacing the output signal generation device 20 of the n-element array antenna transmitter 60 of the first embodiment illustrated in FIG. 1 with the output signal generation device 20d. The output signal generation device 20d has a configuration obtained by adding a band-pass filter 31 and a band-stop filter 32 to the output signal generation device 20 of the first embodiment illustrated in FIG. 1. The output signal generation device 20d has a configuration in which two types of filters, that is, the band-pass filter 31 and the band-stop filter 32 can be used while being switched.

The band-pass filter 31 allows a frequency band of passing frequencies having been set therein to pass therethrough. The band-stop filter 32 blocks passage of a frequency band of stopping frequencies having been set therein. For example, in a case where the transmission signal generation unit 10 uses the delta-sigma DAC illustrated in FIG. 2, when the sampling rate is "fs", the passing frequency of the band-pass filter 31 is set to fs/4, and similarly, the stopping frequency of the band-stop filter 32 is set to fs/4. Note that, as for a method of enabling the band-pass filter 31 or the band-stop filter 32, for example, the phase correction unit 21 controls connection destinations of changeover switches situated at a preceding stage and a subsequent stage of the band-pass filter 31 and the band-stop filter 32 illustrated in FIG. 19. Alternatively, unlike the configuration of FIG. 19, the output signal generation device 20d may have a path of the switching unit 27→the band-pass filter 31→the level measurement unit 28 and another path of the switching unit 27→the band-stop filter 32→the level measurement unit 28, and in this concept the switching unit 27 may select any one of the paths on the basis of a switching signal from the phase correction unit 21 and output the third serial signal from the desired one of the reference multiplex units 26.

Figure 20:
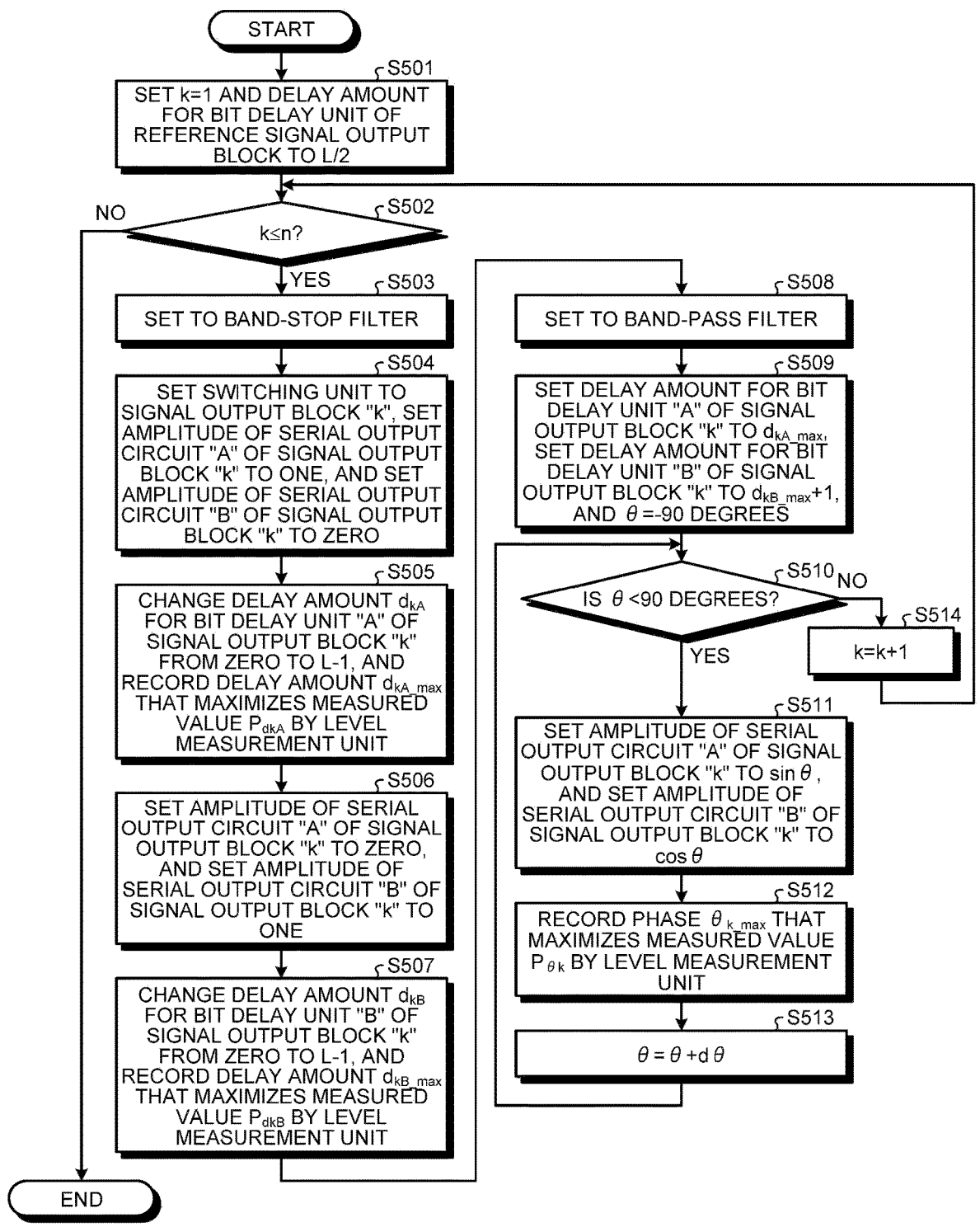
FIG. 20 is a flowchart illustrating an example of an operation at the time of zero point matching of an output signal phase of each signal output block in the phase correction unit included in the output signal generation device according to the fifth embodiment.

FIG. 20 is a flowchart illustrating an example of an operation at the time of zero point matching of an output signal phase of each signal output block 22 in the phase correction unit 21 included in the output signal generation device 20d according to the fifth embodiment. As illustrated in FIG. 20, in the fifth embodiment, when searching for the delay amounts $d_{kA\_min}$ and $d_{kB\_min}$ for the bit delay unit 221, the phase correction unit 21 enables the band-stop filter 32 and searches for a point at which a measured value of the level measurement unit 28 is maximum. Furthermore, when searching for the phase $\theta_{k\_max}$, the phase correction unit 21 enables the band-pass filter 31 and searches for a point at which a measured value of the level measurement unit 28 is maximum.

Specifically, the phase correction unit 21 sets k=1 and sets the delay amount for the bit delay unit 221-(n+1) of the reference signal output block 23 to L/2 (step S501). If k≤n (Yes in step S502), the phase correction unit 21 sets the band-stop filter 32 as a filter to be used (step S503). The phase correction unit 21 sets connection of the switching unit 27 to the signal output block 22-k. The phase correction unit 21 sets the amplitude of the serial output circuit 222-kA of the signal output block 22-k to one, and sets the amplitude of the serial output circuit 222-kB of the signal output block 22-k to zero (step S504). The phase correction unit 21 changes the delay amount $d_{kA}$ for the bit delay unit 221-kA of the signal output block 22-k from zero to L−1, and records the delay amount $d_{kA\_max}$ at which the measured value $P_{dkA}$ of the level measurement unit 28 becomes the maximum (step S505). The phase correction unit 21 sets the amplitude of the serial output circuit 222-kA of the signal output block 22-k to zero, and sets the amplitude of the serial output circuit 222-kB of the signal output block 22-k to one (step S506). The phase correction unit 21 changes the delay amount $d_{kB}$ for the bit delay unit 221-kB of the signal output block 22-k from zero to L−1, and records the delay amount $d_{kB\_max}$ at which the measured value $P_{dkB}$ of the level measurement unit 28 becomes the maximum (step S507).

The phase correction unit 21 sets the band-pass filter 31 as a filter to be used (step S508). The phase correction unit 21 sets $d_{kA\_max}$ as the delay amount for the bit delay unit 221-kA of the signal output block 22-k, sets $d_{kB\_max}$+1 as the delay amount for the bit delay unit 221-kB of the signal output block 22-k, and sets θ=−90 degrees (step S509). If θ<90 degrees (Yes in step S510), the phase correction unit 21 sets the amplitude of the serial output circuit 222-kA of the signal output block 22-k to sin θ, and sets the amplitude of the serial output circuit 222-kB of the signal output block 22-k to cos θ (step S511). The phase correction unit 21 records the phase $\theta_{k\_max}$ at which the measured value $P_{\theta k}$ of the level measurement unit 28 is maximum (step S512). The phase correction unit 21 increments the value of θ as with θ=θ+dθ (step S513). The phase correction unit 21 returns to step S510 and repeats the operations from step S511 to step S513 until θ≥90 degrees. If θ≥90 degrees (No in step S510), the phase correction unit 21 increments the value of "k" as with k=k+1 (step S514). The phase correction unit 21 returns to step S502 and repeats the operations from step S503 to step S514 until k>n. If k>n (No in step S502), the phase correction unit 21 ends the operation of the flowchart illustrated in FIG. 20.

In a case where the delta-sigma DAC illustrated in FIG. 2 is used for the transmission signal generation unit 10, the data signal outputted from the transmission signal generation unit 10 has a frequency spectrum as illustrated in FIG. 4. In the frequency spectrum, noise present outside the signal band has a wide band and high randomness, and a sharp autocorrelation characteristic is obtained. Moreover, the phase combining function of the signal output block 22 as illustrated in FIG. 7 functions only in the frequency band near fs/4, so that when the phase $\theta_{k\_max}$ is searched for, it is desirable to extract and correlate signals only in the vicinity of fs/4.

Note that the output signal generation device 20d may be configured to include only one of the band-pass filter 31 and the band-stop filter 32 instead of including the two filters. That is, the output signal generation device 20d may include only the band-pass filter 31 or only the band-stop filter 32. In this case, the output signal generation device 20d is modified by replacing the part corresponding to the band-stop filter 32 in the configuration illustrated in FIG. 19 with a simple wiring line when including only the band-pass filter 31, or by replacing the part corresponding to the band-pass filter 31 in the configuration illustrated in FIG. 19 with a simple wiring line when including only the band-stop filter 32. In addition, the output signal generation device 20d is modified to omit the operation of step S503 in the flowchart illustrated in FIG. 20 when including only the band-pass filter 31, or to omit the operation of step S508 in the flowchart illustrated in FIG. 20 when including only the band-stop filter 32.

As described above, according to the present embodiment, the phase correction unit 21 in the output signal generation device 20d uses the band-stop filter 32 for searching for the delay amounts $d_{kA\_min}$ and $d_{kB\_min}$ of the bit delay units 221, thereby making it possible to use the sharp autocorrelation characteristic of the noise outside the signal band. Besides, the phase correction unit 21 uses the band-pass filter 31 for searching for the phase $\theta_{k\_max}$, thereby making it possible to extract and correlate signals only in the vicinity of fs/4.

The output signal generation device according to the present disclosure has an advantageous effect that it is able to improve accuracy in adjustment of phases of serial signals when outputting a plurality of serial signals.

The configurations illustrated in the above embodiments illustrate just examples, and can each be combined with other publicly known techniques, or the embodiments can be combined with each other. Furthermore, each of the configurations can be partially omitted and/or modified without departing from the scope of the present disclosure.

What is claimed is:

1. An output signal generation device comprising:
   two or more signal output circuitries each including two or more serial output circuits and a signal multiplexer, the serial output circuits controlling amplitudes of data signals having different delay times and each outputting a first serial signal, the signal multiplexer electrically multiplexing the first serial signals outputted from the two or more of the serial output circuits, the signal output circuitries each being configured to output a second serial signal obtained by electrical multiplex of the signal multiplexer; and
   a phase corrector to control a phase of the second serial signal outputted from the two or more signal output circuitries by changing the amplitude of the first serial signal outputted from the serial output circuit.

2. The output signal generation device according to claim 1, wherein
   each of the signal output circuitries includes two or more bit delay circuits that are each able to delay the data signal by one bit or more and output the data signal delayed to a corresponding one of the serial output circuits, and the phase corrector controls the phase of the second serial signal outputted from the two or more signal output circuitries by further use of the number of delay bits in the bit delay circuit.

3. The output signal generation device according to claim 1, wherein
the phase corrector controls the phase of the second serial signal outputted from the two or more signal output circuitries further by change in phase of a reference clock in the serial output circuit.

4. The output signal generation device according to claim 1, wherein
each of the signal output circuitries includes two or more bit delay circuits that are each able to delay the data signal by one bit or more and output the data signal delayed to a corresponding one of the serial output circuits, and
the phase corrector controls the phase of the second serial signal outputted from the two or more signal output circuitries by further use of the number of delay bits in the bit delay circuit and by change in phase of a reference clock in the serial output circuit.

5. The output signal generation device according to claim 1, wherein
the signal output circuitry is connected to a transmission signal generator including a feedback filter and acquires, from the transmission signal generator, the data signal generated by the transmit signal generator using the feedback filter.

6. The output signal generation device according to claim 1, comprising:
one or more reference signal output circuitries including the serial output circuit, to output a reference serial signal;
one or more reference signal distributors to distribute the reference serial signal acquired from the reference signal output circuitry;
two or more reference multiplexers to each electrically multiplex one of the reference serial signal outputted from the reference signal distributor and the second serial signal outputted from one of the signal output circuitries; and
a level measurer to measure an output level of a third serial signal obtained by electrical multiplex of the reference multiplexers, wherein
the phase corrector controls the phase of the second serial signal outputted from the two or more signal output circuitries on the basis of the output level of the third serial signal measured by the level measurer.

7. The output signal generation device according to claim 6, wherein
the reference signal output circuitry is connected to a transmission signal generator including a feedback filter and acquires, from the transmission signal generator, the data signal generated by the transmission signal generator using the feedback filter.

8. The output signal generation device according to claim 6, comprising
a bit inverter to control bit inversion of the data signal, wherein
the reference signal output circuitry is connected to a transmission signal generator including a feedback filter, via the bit inverter, and acquires, from the transmission signal generator via the bit inverter, the data signal generated by the transmission signal generator using the feedback filter.

9. The output signal generation device according to claim 6, comprising
a band-pass filter provided in a stage preceding the level measurer, to allow passage of a frequency band of a pass frequency having been set therein.

10. The output signal generation device according to claim 6, comprising
a band-stop filter provided in a stage preceding the level measurer, to block passage a frequency band of stop frequency having been set therein.

11. The output signal generation device according to claim 6, comprising:
a band-pass filter provided in a stage preceding the level measurer, to allow passage of a frequency band of a pass frequency having been set therein; and
a band-stop filter provided in a stage preceding the level measurer, to block passage of a frequency band of a stop frequency having been set therein, wherein
the band-pass filter or the band-stop filter can be used with switching therebetween.

12. The output signal generation device according to claim 1, comprising:
one or more reference signal output circuitries having the same configuration as the signal output circuitry, to output a reference serial signal;
one or more reference signal distributors to distribute the reference serial signal outputted from the reference signal output circuitry;
two or more reference multiplexers to each electrically multiplex one of the reference serial signal outputted from the reference signal distributor and the second serial signal outputted from one of the signal output circuitries; and
a level measurer to measure an output level of a third serial signal obtained by electrical multiplex of the reference multiplexers, wherein
the phase corrector controls the phase of the second serial signal outputted from the two or more signal output circuitries on the basis of the output level of the third serial signal measured by the level measurer.

13. The output signal generation device according to claim 12, wherein
the reference signal output circuitry is connected to a transmission signal generator including a feedback filter and acquires, from the transmission signal generator, the data signal generated by the transmission signal generator using the feedback filter.

14. The output signal generation device according to claim 12, comprising
a bit inverter to control bit inversion of the data signal, wherein
the reference signal output circuitry is connected to a transmission signal generator including a feedback filter, via the bit inverter, and acquires, from the transmission signal generator via the bit inverter, the data signal generated by the transmission signal generator using the feedback filter.

15. The output signal generation device according to claim 12, comprising
a band-pass filter provided in a stage preceding the level measurer, to allow passage of a frequency band of a pass frequency having been set therein.

16. The output signal generation device according to claim 12, comprising
a band-stop filter provided in a stage preceding the level measurer, to block passage a frequency band of stop frequency having been set therein.

17. The output signal generation device according to claim 12, comprising:
- a band-pass filter provided in a stage preceding the level measurer, to allow passage of a frequency band of a pass frequency having been set therein; and
- a band-stop filter provided in a stage preceding the level measurer, to block passage of a frequency band of a stop frequency having been set therein, wherein
- the band-pass filter or the band-stop filter can be used with switching therebetween.

18. A control circuit for controlling an output signal generation device, the control circuit causing the output signal generation device to perform:
- outputting, from two or more signal output circuitries each including two or more serial output circuits and a signal multiplexer, the serial output circuits controlling amplitudes of data signals having different delay times and each outputting a first serial signal, the signal multiplexer electrically multiplexing the first serial signals outputted from the two or more serial output circuits, a second signal obtained by electrical multiplex of the signal multiplexer; and
- controlling a phase of the second serial signal outputted from the two or more signal output circuitries by changing the amplitude of the first serial signal outputted from the serial output circuit.

19. A non-transitory computer readable medium in which instructions are stored,
- the instruction, when executed by an output signal generating device, causing the output signal generation device to perform:
  - outputting, from two or more signal output circuitries each including two or more serial output circuits and a signal multiplexer, the serial output circuits controlling amplitudes of data signals having different delay times and each outputting a first serial signal, the signal multiplexer electrically multiplexing the first serial signals outputted from the two or more serial output circuits, a second signal obtained by electrical multiplex of the signal multiplexer; and
  - controlling a phase of the second serial signal outputted from the two or more signal output circuitries by changing the amplitude of the first serial signal outputted from the serial output circuit.

20. A phase correction method comprising:
- a first step in which two or more signal output circuitries each include two or more serial output circuits and a signal multiplexer, the serial output circuits controlling amplitudes of data signals having different delay times and each outputting a first serial signal, the signal multiplexer electrically multiplexing the first serial signals outputted from the two or more serial output circuits, and output a second serial signal obtained by electrical multiplex of the signal multiplexer; and
- a second step in which a phase corrector controls a phase of the second serial signal outputted from the two or more signal output circuitries by changing the amplitude of the first serial signal outputted from the serial output circuit.

* * * * *